(12) United States Patent
Liu et al.

(10) Patent No.: US 12,354,815 B2
(45) Date of Patent: Jul. 8, 2025

(54) LIGHTING KEYBOARD, BACKLIGHT MODULE AND LIGHTING BOARD

(71) Applicant: DARFON ELECTRONICS CORP., Taoyuan (TW)

(72) Inventors: Ying-Lan Liu, Taoyuan (TW); Heng-Yi Huang, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 361 days.

(21) Appl. No.: 18/131,885

(22) Filed: Apr. 7, 2023

(65) Prior Publication Data

US 2023/0377816 A1    Nov. 23, 2023

Related U.S. Application Data

(63) Continuation-in-part of application No. 18/127,667, filed on Mar. 29, 2023, now abandoned.

(Continued)

(30) Foreign Application Priority Data

Mar. 31, 2023    (TW) .................................. 112112546

(51) Int. Cl.
*H01H 13/83*    (2006.01)
*F21V 8/00*    (2006.01)
*H01H 13/705*    (2006.01)

(52) U.S. Cl.
CPC ........... *H01H 13/83* (2013.01); *G02B 6/0021* (2013.01); *G02B 6/0055* (2013.01);
(Continued)

(58) Field of Classification Search
CPC ........ H01H 13/00; H01H 13/02; H01H 13/14; H01H 13/023; H01H 13/12; H01H 13/50;
(Continued)

(56) References Cited

U.S. PATENT DOCUMENTS 6,743,993 B1    6/2004    Clark
8,173,922 B2 *  5/2012    Chen ...................... H01H 13/83
                                                      200/314

(Continued)

FOREIGN PATENT DOCUMENTS

CN    101514801 A    8/2009
CN    201758091 U    3/2011
(Continued)

OTHER PUBLICATIONS

Chen, the specification, including the claims, and drawings in the U.S. Appl. No. 18/369,217, filed Sep. 18, 2023.

(Continued)

*Primary Examiner* — Anthony R Jimenez
(74) *Attorney, Agent, or Firm* — Winston Hsu

(57) ABSTRACT

A lighting keyboard includes a backlight module and a keyswitch. The backlight module includes two lighting units, a light guide panel, a lighting board and a micro-structure layer. The light guide panel includes two panel holes to accommodate the two lighting units. The light guide panel further includes at least one slot located between the two lighting units. The lighting board is disposed in parallel to the light guide panel, and the lighting board includes at least one pair of non-parallel main traces in electrical connection with the two lighting units. The micro-structure layer is disposed in parallel to the light guide panel, and the micro-structure layer includes at least one micro-structure region. The at least one micro-structure region is disposed between the two lighting units, and meanwhile the at least one slot of the light guide panel is at least partially located within the at least one micro-structure region.

22 Claims, 19 Drawing Sheets

Related U.S. Application Data

(60) Provisional application No. 63/325,623, filed on Mar. 31, 2022, provisional application No. 63/430,675, filed on Dec. 7, 2022, provisional application No. 63/378,261, filed on Oct. 4, 2022, provisional application No. 63/453,761, filed on Mar. 22, 2023.

(52) U.S. Cl.
CPC ....... *H01H 13/705* (2013.01); *H01H 2219/04* (2013.01); *H01H 2219/06* (2013.01)

(58) Field of Classification Search
CPC ...... H01H 13/52; H01H 13/70; H01H 13/702; H01H 2219/048; H01H 9/16; H01H 9/18; H01H 9/182; H01H 2003/08; H01H 2003/12; H01H 2009/16; H01H 2009/161; H01H 2009/164; H01H 2013/00; H01H 2013/02; H01H 2013/50; H01H 2013/52; H01H 2219/04; H01H 2219/06; G02B 6/0021; G02B 6/0055; G02B 6/0038; G02B 6/0046
USPC .......................................................... 200/310
See application file for complete search history.

(56) References Cited

U.S. PATENT DOCUMENTS

| | | | |
|---|---|---|---|
| 9,040,856 | B2 | 5/2015 | Chen |
| 9,214,301 | B2 | 12/2015 | Chen |
| 9,299,515 | B2 | 3/2016 | Chen |
| 10,276,327 | B2 | 4/2019 | Chen |
| 10,586,664 | B2 | 3/2020 | Yeh |
| 11,036,306 | B2 | 6/2021 | Cheng |
| 11,170,950 | B2 | 11/2021 | Liang |
| 11,257,638 | B2 | 2/2022 | Liang |
| 11,371,676 | B2 | 6/2022 | Huang |
| 11,409,373 | B2 | 8/2022 | Cheng |
| 11,443,907 | B2 | 9/2022 | Ho |
| 11,515,107 | B2 | 11/2022 | Chen |
| 11,538,641 | B2 | 12/2022 | Liang |
| 11,804,343 | B2 * | 10/2023 | Chen ...................... G06F 1/169 |
| 2009/0140891 | A1 | 6/2009 | Ragusa |
| 2011/0037730 | A1 | 2/2011 | Wang |
| 2012/0275193 | A1 | 11/2012 | Yoshida |
| 2014/0166457 | A1 | 6/2014 | Chen |
| 2017/0352504 | A1 | 12/2017 | Chen |
| 2019/0027326 | A1 | 1/2019 | Tsai |
| 2019/0369744 | A1 | 12/2019 | Wu |
| 2019/0371538 | A1 | 12/2019 | Huang |
| 2020/0402748 | A1 | 12/2020 | Cheng |
| 2022/0406977 | A1 | 12/2022 | Ho |
| 2023/0047235 | A1 | 2/2023 | Chen |

FOREIGN PATENT DOCUMENTS

| | | | |
|---|---|---|---|
| CN | 203377146 | U | 1/2014 |
| CN | 104252987 | A | 12/2014 |
| CN | 106301323 | A | 1/2017 |
| CN | 106783308 | A | 5/2017 |
| CN | 110335775 | A | 10/2019 |
| CN | 110880456 | A | 3/2020 |
| CN | 214310968 | U | 9/2021 |
| CN | 113632249 | A | 11/2021 |
| JP | 2019-139728 | | 8/2019 |
| TW | I269993 | | 1/2007 |
| TW | M321552 | | 11/2007 |
| TW | M334393 | | 6/2008 |
| TW | 200945114 | | 11/2009 |
| TW | M395202 | U1 | 12/2010 |
| TW | I416565 | B | 11/2013 |
| TW | 201419343 | A | 5/2014 |
| TW | I494960 | B | 8/2015 |
| TW | I527075 | B | 3/2016 |
| TW | M548881 | U | 9/2017 |
| TW | I604484 | B | 11/2017 |
| TW | 201824318 | A | 7/2018 |
| TW | I632577 | B | 8/2018 |
| TW | I725894 | | 4/2021 |
| TW | 202143270 | A | 11/2021 |
| TW | 202211277 | A | 3/2022 |
| TW | I760181 | B | 4/2022 |

OTHER PUBLICATIONS

Chen, the specification, including the claims, and drawings in the U.S. Appl. No. 18/368,538, filed Sep. 14, 2023.
Chen, the specification, including the claims, and drawings in the U.S. Appl. No. 18/376,818, filed Oct. 4, 2023.
Huang, the specification, including the claims, and drawings in the U.S. Appl. No. 18/330,342, filed Jun. 6, 2023.
Huang, the specification, including the claims, and drawings in the U.S. Appl. No. 18/127,667, filed Mar. 29, 2023.
Liu, the specification, including the claims, and drawings in the U.S. Appl. No. 18/297,020, filed Spr. 7, 2023.
Liu, the specification, including the claims, and drawings in the U.S. Appl. No. 18/128,235, filed Mar. 30, 2023.
Chen, the specification, including the claims, and drawings in the U.S. Appl. No. 18/128,261, filed Mar. 30, 2023.

* cited by examiner

LIGHTING KEYBOARD, BACKLIGHT MODULE AND LIGHTING BOARD

CROSS REFERENCE TO RELATED APPLICATION

This application is a continuation-in-part of U.S. application Ser. No. 18/127,667, filed on Mar. 29, 2023, which claims the benefit of U.S. Provisional Application No. 63/325,623, filed on Mar. 31, 2022, and claims the benefit of U.S. Provisional Application No. 63/430,675, filed on Dec. 7, 2022, and claims the benefit of U.S. Provisional Application No. 63/378,261, filed on Oct. 4, 2022. Further, this application claims the benefit of U.S. Provisional Application No. 63/453,761, filed on Mar. 22, 2023. The contents of these applications are incorporated herein by reference.

BACKGROUND OF THE INVENTION

1. Field of the Invention

The present invention relates to a lighting keyboard, a backlight module and a lighting board, and more specifically, to a lighting keyboard, a backlight module and a lighting board capable of improving the overall and single-key light mixing effects and enhancing the overall and single-key color visual effects.

2. Description of the Prior Art

As technology advances, there are many types of keyboards in use. Users pay much more attention to visual effect of keyboard except basic input function while choosing keyboard. So far a lighting keyboard has been developed. The lighting keyboard attracts users in visual effect and can be used in darkness. Since the lighting keyboard of the prior art applies a low luminous light emitting diode (LED) to illuminate each of square keyswitches, the following problems may occur: 1) the main symbol above the LED is over-illuminated and the corner symbol(s) of keycap is too dark; 2) the surrounding outlet for keycap peripheral is inconsistent; and 3) the overall illuminating consistency on a single square keyswitch and on plural keyswitches are both not good.

SUMMARY OF THE INVENTION

One purpose of the present invention is to provide a lighting keyboard, a backlight module and a lighting board capable of improving the overall and single-key light mixing effects and enhancing the overall and single-key color visual effects.

According to one embodiment, the present invention provides a backlight module for emitting at least one keycap. The backlight module includes two lighting units, a light guide panel, a lighting board and a micro-structure layer. The light guide panel has two panel holes for accommodating the two lighting units. The light guide panel further includes at least one slot located between the two lighting units. The lighting board is disposed in parallel to the light guide panel. The lighting board has at least one pair of non-intersecting main traces electrically connected to the two lighting units. The micro-structure layer is disposed in parallel to the light guide panel. The micro-structure layer includes at least one micro-structure region, wherein the at least one micro-structure region is located between the two lighting units, and the at least one slot of the light guide panel is at least partially located in the micro-structure region.

According to another embodiment, the light guide panel has two slots corresponding to the two lighting units, and the micro-structure region is at least partially located between the two slots. According to another embodiment, the pair of non-intersecting main traces passes through the at least one slot. According to another embodiment, the at least one micro-structure region is not overlapped with the pair of non-intersecting main traces. According to another embodiment, the micro-structure region at least partially surrounds the at least one slot. According to another embodiment, the at least one micro-structure region is at least partially overlapped with the at least one slot. According to another embodiment, the backlight module further includes a shielding sheet, and the shielding sheet comprises an inner reflecting portion covering the lighting unit. According to another embodiment, the backlight module further includes a shielding sheet, the shielding sheet includes a reflective layer hole allowing light to exit, and the micro-structure region is at least partially located between the reflective layer hole and the at least one slot. According to another embodiment, the backlight module further includes a shielding sheet, the shielding sheet includes two adjacent reflective layer holes allowing light to exit, and the at least one slot is located between the two adjacent reflective layer holes. According to another embodiment, the backlight module further includes a shielding sheet, and the micro-structure region is located on a surface of at least one of the shielding sheet, the light guide panel and the lighting board. According to another embodiment, the backlight module further includes a shielding sheet, the shielding sheet includes two adjacent reflective layer holes allowing light to exit, and the pair of non-intersecting main traces passes through the two reflective layer holes. According to another embodiment, the lighting board further has a first reflective layer, and the micro-structure region is located on a surface of the first reflective layer. According to another embodiment, the lighting board further has a first reflective layer covering the pair of non-intersecting main traces. According to another embodiment, the lighting unit includes three chips for providing three color lights, and the three chips are arranged continuously from short side to short side. According to another embodiment, the backlight module has a board hole, and the at least one slot is connected to the board hole. According to another embodiment, the micro-structure region is located between the pair of non-intersecting main traces. According to another embodiment, the at least one slot is located between the pair of non-intersecting main traces.

According to another embodiment, the present invention provides a backlight module for emitting at least one keycap. The backlight module includes a lighting unit, a light guide panel, a lighting unit and a micro-structure layer. The light guide panel has a panel hole for accommodating the lighting unit. The light guide panel further includes a slot pattern surrounding the lighting unit, and the slot pattern includes a plurality of slots. The lighting board has at least one pair of non-intersecting traces electrically connected to the lighting unit. The micro-structure layer is disposed in parallel to the light guide panel, and the micro-structure layer includes at least one micro-structure region, wherein the slot pattern is overlapped with the at least one micro-structure region.

According to another embodiment, the present invention provides a backlight module for emitting at least one keycap. The backlight module includes a lighting unit, a light guide panel, a lighting unit and a shielding sheet. The light guide panel has a panel hole for accommodating the lighting unit, and the light guide panel further has an edge away from the lighting unit. The lighting board has at least one pair of non-intersecting traces electrically connected to the lighting unit. The shielding sheet includes a reflective layer hole allowing light to exit, wherein a micro-structure region is at least partially located between the reflective layer hole and the edge of the light guide panel. According to another embodiment, the light guide panel has a slot and an edge, the slot is located outside the reflective layer hole, and the micro-structure region is formed between the edge and the slot of the light guide panel.

According to another embodiment, the present invention provides a lighting keyboard including a plurality of keyswitches having a keycap respectively. The lighting keyboard further includes the backlight module according to the aforesaid embodiments. The backlight module is located under the plurality of keyswitches.

According to another embodiment, the present invention provides a lighting board including a light guide panel, at least one pair of non-intersecting traces, a micro-structure layer and a lighting unit. The light guide panel includes a panel hole and at least two slots. The at least one pair of non-intersecting traces is disposed in parallel to the light guide panel. The micro-structure layer is disposed in parallel to the light guide panel, and the micro-structure layer includes at least two micro-structure regions spaced apart from each other. The lighting unit is located in the panel hole and located between the at least two micro-structure regions, wherein the at least two slots surround the lighting unit, and the at least two micro-structure regions are located between the at least two slots.

According to another embodiment, the present invention provides a lighting board including three lighting units, a light guide panel, and at least one micro-structure layer. The light guide panel includes at least three panel holes for accommodating the three lighting units, and the light guide panel further includes at least three slots located between the three lighting units. The at least one micro-structure layer is disposed in parallel to the light guide panel, and the at least one micro-structure layer includes at least one micro-structure region located between the three lighting units, wherein the at least one micro-structure region surrounds the panel hole and the three slots.

In summary, the present invention forms the protrusion structure between the two non-intersecting traces or the plurality of micro-structure regions, and the protrusion structure corresponds to the lighting unit. In such a manner, the present invention can increase the amount of light emitted by the lighting unit entering the light guide panel and utilize the micro-structure regions specifically arranged on the lighting board to recycle light or assist light output, so as to enhance the overall illuminating consistency.

Furthermore, the present invention adopts the optimal configuration of the micro-structure regions and the slots for solving the problem of color light being incident to the adjacent keycaps, the uneven light mixing problem and the slot related problems and making full use of the limited light to achieve the best chroma and color saturation of one single keyswitch. The light mixing effect of the lighting unit can be further improved by the aforesaid arrangement of the three chips.

These and other objectives of the present invention will no doubt become obvious to those of ordinary skill in the art after reading the following detailed description of the preferred embodiment that is illustrated in the various figures and drawings.

DETAILED DESCRIPTION

A low power lighting unit, such as mini LED or micro LED, may be used to reduce power consumption, reduce total heat generated by a backlight module, and reduce the overall thickness of the backlight module, such that it is beneficial to further make a lighting keyboard thinner. However, the highly limited luminous range of mini LED or micro LED causes a great challenge to the luminous uniformity of a single keyswitch and the entire lighting keyboard. The embodiments of the present invention first focus on how to make a large proportion of light from the lighting unit enter a light guide panel for lateral transmission, and how to effectively recycle the light that passes through the light guide panel during the lateral transmission into the light guide panel for reuse.

Figure 1:
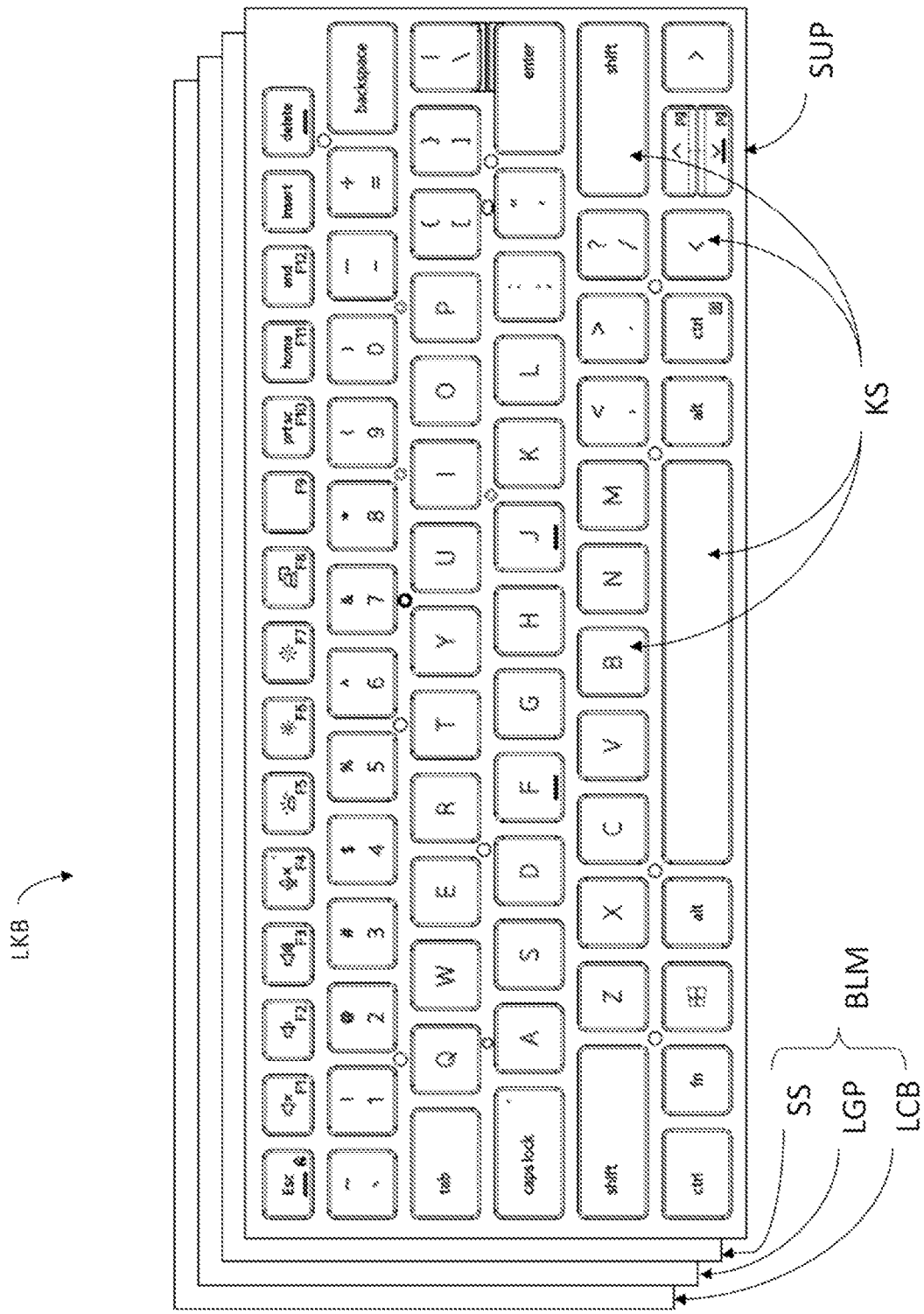
FIG. 1 is a schematic view illustrating a lighting keyboard according to an embodiment of the invention.

Referring to FIG. 1, FIG. 1 is a schematic view illustrating a lighting keyboard LKB according to an embodiment of the present invention.

As shown in FIG. 1, the lighting keyboard LKB includes a backlight module BLM and a plurality of keyswitches KS. A support plate SUP is disposed on the backlight module BLM and the keyswitches KS are disposed on the support plate SUP. In general, the keyswitches KS may include square keys and multiple keys (e.g., space key). It should be noted that the number, size and arrangement of the keyswitches KS may be determined according to practical applications, so the present invention is not limited to the embodiment shown in the figure.

The backlight module BLM includes a lighting board LCB, a light guide panel LGP and a shielding sheet SS. The light guide panel LGP is disposed on the lighting board LCB and the shielding sheet SS is disposed on the light guide panel LGP. Each keyswitch KS on the lighting keyboard LKB corresponds to at least one lighting unit (e.g., LED) on the lighting board LCB of the backlight module BLM.

Figure 2:
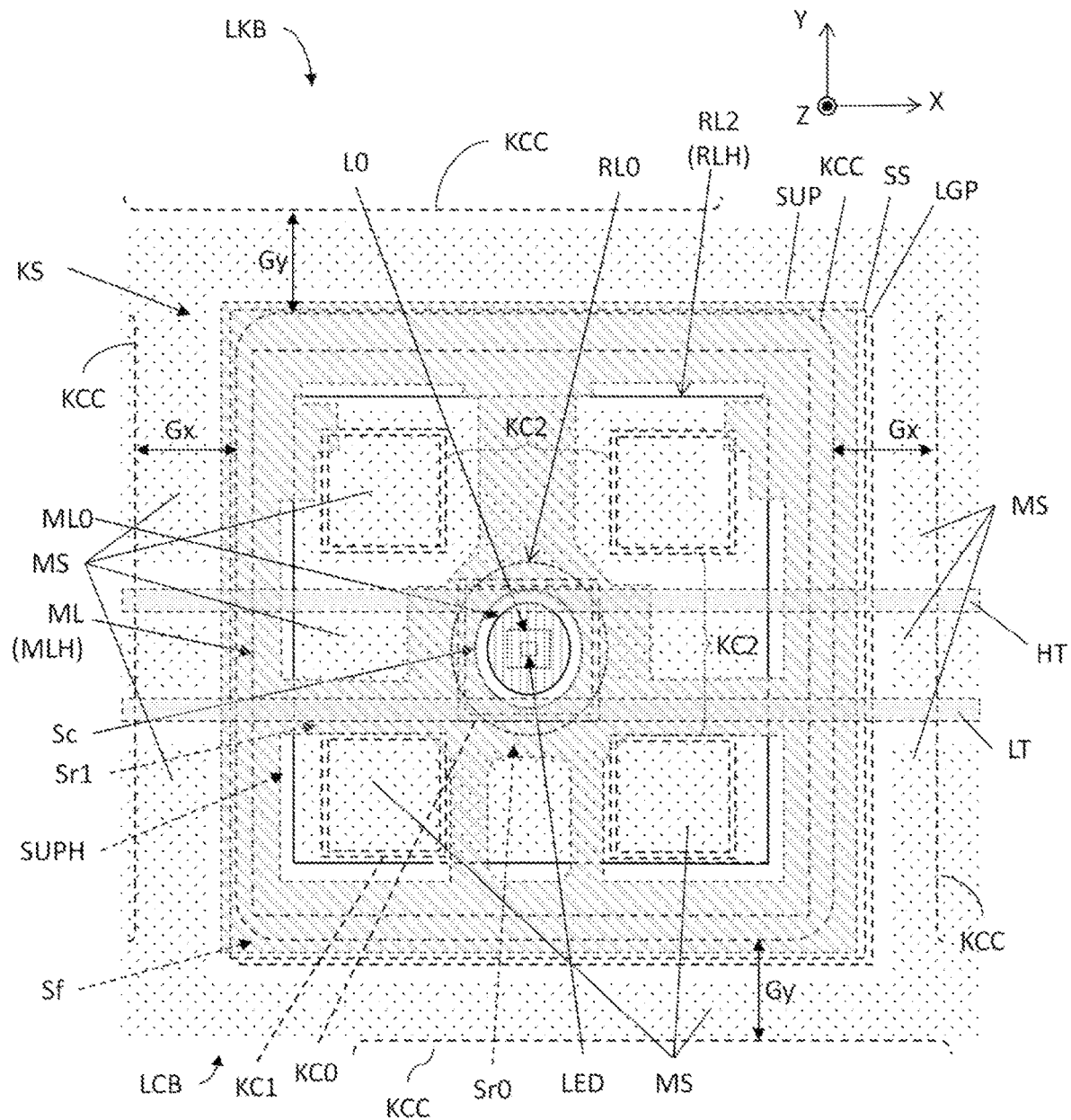
FIG. 2 is a partial top view illustrating the lighting keyboard shown in FIG. 1.
Figure 3:
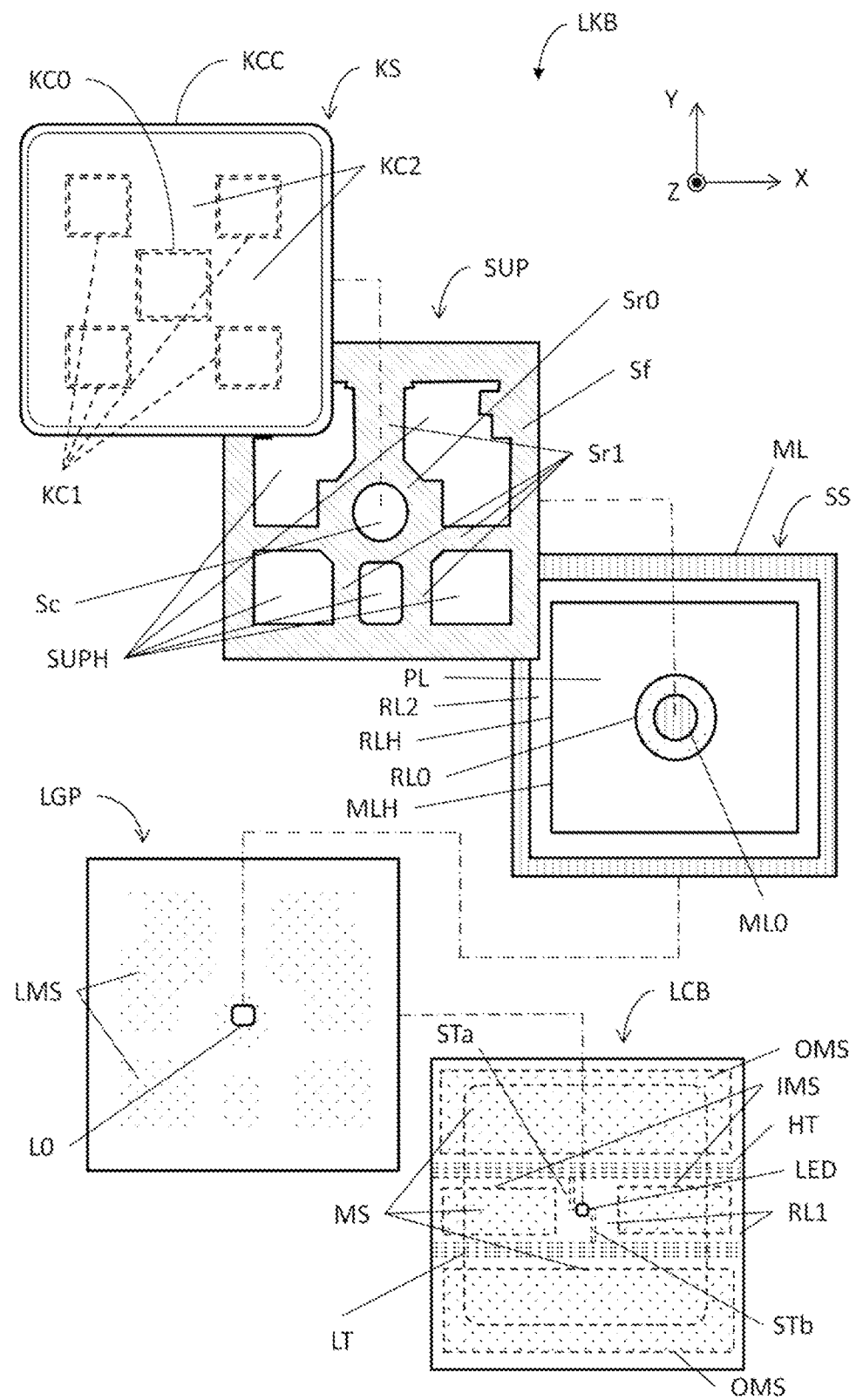
FIG. 3 is a partial exploded view illustrating the lighting keyboard shown in FIG. 1.
Figure 4:
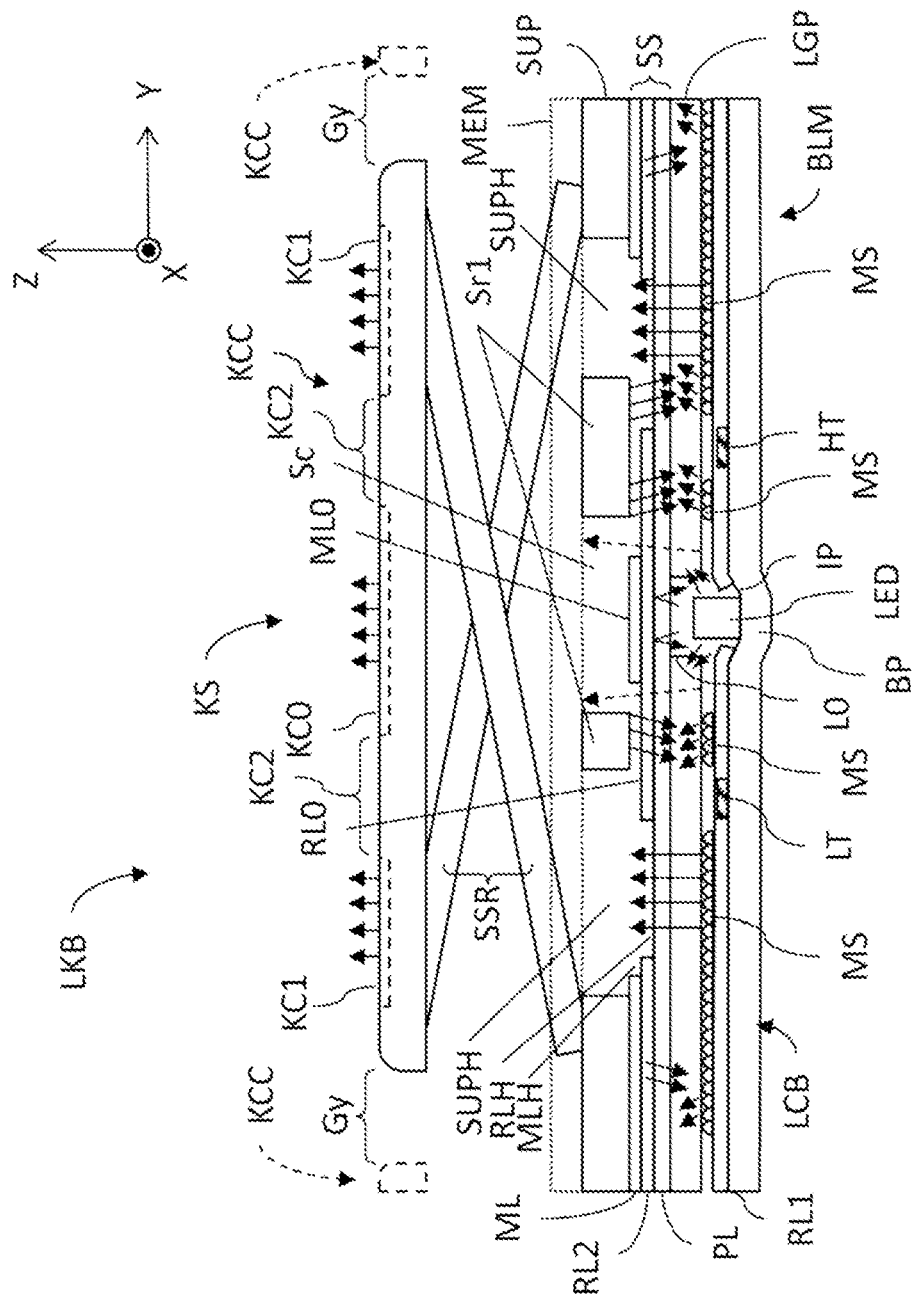
FIG. 4 is a partial sectional view illustrating the lighting keyboard shown in FIG. 1.

Referring to FIGS. 2-4, FIG. 2 is a partial top view illustrating the lighting keyboard LKB shown in FIG. 1, FIG. 3 is a partial exploded view illustrating the lighting keyboard LKB shown in FIG. 1, and FIG. 4 is a partial sectional view illustrating the lighting keyboard LKB shown in FIG. 1.

As shown in FIGS. 2-4, the lighting board LCB includes two non-intersecting traces LT, HT, another two non-intersecting traces STa, STb, a lighting unit LED, a first reflective layer RL1 and a plurality of micro-structure regions MS. The lighting board LCB may be a lighting circuit board. The lighting unit LED is connected between the two non-intersecting traces STa, STb, and the lighting unit LED is connected between the two non-intersecting traces LT, HT through the two non-intersecting traces STa, STb. In this embodiment, the traces LT, HT are main traces of the lighting unit LED and the traces STa, STb are sub-traces of the lighting unit LED, wherein the trace LT may be a low-voltage trace and the trace HT may be a high-voltage trace. The lighting unit LED may be a white LED or a combination of RGB LEDs according to practical applications. In general, the traces LT, HT may be the main traces with a larger cross-sectional area and may cross a plurality of keyswitches KS. The traces LT, HT do not intersect at least within a range of a single keyswitch KS, or do not intersect within a larger continuous range including a plurality of adjacent keyswitches KS and the gap(s) therebetween. The pair of traces STa, STb disposed within the range of each single keyswitch KS are sub-traces with a smaller cross-sectional area. Although the traces STa, STb may be located at the same line, the ends of the traces STa, STb are respectively connected to two electrodes of the lighting unit LED. Thus, the traces STa, STb do not overlap with each other.

The first reflective layer RL1 is disposed on the two non-intersecting traces LT, HT and the other two non-intersecting traces STa, STb. The micro-structure regions MS are formed on the first reflective layer RL1. In this embodiment, the micro-structure regions MS may be a concave-convex structure formed on the first reflective layer RL1. For example, the lighting board LCB may be composed of a flexible circuit board and a copper mesh may be commonly used to improve the support strength of the circuit board. The first reflective layer RL1 may be formed by coating reflective paint or covering a reflective film on the surface of the flexible circuit board (including the surface of the copper mesh). The grid structure of the copper mesh may make the first reflective layer RL1 form regular concave points (grid points) and convex regions (grid lines). The concave points and convex regions function as reflective points capable of reflecting light back to the light guide panel LGP. In fact, copper trace regions (e.g., traces LT, HT, STa, STb) may also form protruding linear reflective regions. In principle, the copper mesh does not overlap with the traces LT, HT on the flexible circuit board and does not electrically connect the traces STa, STb. In practical applications, the copper mesh can achieve an effect of shielding radio frequency interference, so the copper mesh may be connected to the ground of the traces. However, in practice, a concave-convex reflective structure may not be possible to be formed by any reflective layer covering the copper mesh and traces. If the first reflective layer RL1 is an independent thin film component, the thickness of the first reflective layer RL1 must be thin enough, e.g., lower than the thickness of the copper foil substrate (including the adjacent tiled copper mesh and copper trace region). Furthermore, the first reflective layer RL1 needs to have a high degree of plasticity, so as to form a concave-convex micro-structure on the copper mesh and copper trace region when covering the copper foil substrate. If the first reflective layer RL1 is formed by ink coating, the coating thickness, ink consistency, coating region control, etc. must be strictly controlled; otherwise the hollow space of the original copper foil substrate will be easily filled by ink flow, which will reduce the depth of the reflective micro-structure and the effect of reflective diffusion.

In addition, even if the traces of the lighting board LCB are not copper foil substrate and there is neither a thicker copper trace nor a copper mesh to strengthen the structural strength of the lighting board LCB, a micro-structure with a diffusion effect may still be formed on the first reflective layer RL1. For example, micro-dot ink may be printed on the first reflective layer RL1 to form concave/convex regions as the micro-structure regions MS; or the ink with larger size reflective particles may be used to spray or print the first reflective layer RL1 to simultaneously form the concave/convex regions as the micro-structure regions MS; or, if the first reflective layer RL1 is a layer of reflective film, as long as the surface of the reflective film has reflective particles with medium or low flatness or has a concave-convex reflective surface, the reflective film may be used as the micro-structure regions MS.

In this embodiment, within a range of a single keyswitch KS, the micro-structure regions MS includes two inner micro-structure regions IMS and two outer micro-structure regions OMS, wherein the two inner micro-structure regions IMS are located between the two non-intersecting traces LT, HT, and the two outer micro-structure regions OMS are located beyond the two non-intersecting traces LT, HT. The patterns of the two inner micro-structure regions IMS may be different from the patterns of the two outer micro-structure regions OMS, but the present invention is not so limited. The lighting unit LED is located between the micro-structure regions MS, i.e., the lighting unit LED is located between the two inner micro-structure regions IMS and also located between the two outer micro-structure regions OMS.

In this embodiment, the traces STa, STb separate the two inner micro-structure regions IMS, so the traces STa, STb are also located between the two inner micro-structure regions IMS. Similarly, the traces LT, HT respectively separate one outer micro-structure region OMS and two inner micro-structure regions IMS, so it can also be said that the traces LT, HT are respectively located between one outer micro-structure region OMS and two inner micro-structure regions IMS. In some embodiments, the aforesaid micro-structure regions MS, no matter whether they are the outer micro-structure regions OMS or the inner micro-structure regions IMS, neither overlap with the traces LT, HT, nor overlap with the traces STa, STb. For example, there is the case when the traces of the lighting board LCB are formed by copper traces with copper mesh. If the micro-structure regions MS on the first reflective layer RL1 is only surface-treated and not formed from the underlying copper mesh or other substrates, the micro-structure regions MS/OMS/IMS may overlap with the traces LT, HT, or overlap with the traces STa, STb. The light guide panel LGP has a panel hole L0 and the lighting unit LED is located in the panel hole L0. The top surface and/or the bottom surface of the light guide panel LGP close to the panel hole L0 may have adhesive around the panel hole L0 to adhere the shielding sheet SS and/or the lighting board LCB respectively. Furthermore, the light guide panel LGP also has a plurality of micro-structure regions LMS corresponding to the positions of an inner hole Sc and peripheral holes SUPH of the support plate SUP, so as to guide the light transmitted in the light guide panel LGP to emit out upward. Under the orthographic projection of the peripheral hole SUPH of the support plate SUP, the micro-structure regions LMS of the light guide panel LGP may at least partially overlap with the micro-structure regions MS of the first reflective layer RL1 of the lighting board LCB, such that it may increase the illuminating effect of the light passing through the inner hole Sc and the peripheral hole SUPH, and improve the brightness of the corner symbol of the keycap KCC (outer outlet KC1). The inner micro-structure regions IMS, which is on the first reflective layer RL1 of the lighting board LCB and close to the lighting unit LED, may be used as an optical adjustment manner. When the light output near the lighting unit LED is excessively weakened (e.g., resulted from the area of an inner mask layer ML0 of a mask layer ML of the shielding sheet SS being too large or the light transmittance of an inner reflective section RL0 of a second reflective layer RL2 being too low), at this time, the inner micro-structure regions IMS, which is on the first reflective layer RL1 of the lighting board LCB and close to the lighting unit LED, can enhance the illuminating effect of the light passing through the inner hole Sc or the inner outlet KC0 of the keycap KCC.

A preferred manner to optimize the arrangement of the aforesaid micro-structure regions MS/OMS/IMS is to dispose the traces STa, STb, LT, HT as far as possible to overlap with any rib region or frame region (e.g., surrounding rib Sr0, bridge rib Sr1 and support frame Sf) of the support plate SUP. Thus, the aforesaid micro-structure regions MS/OMS/IMS may correspond to the micro-structure regions LMS of the light guide panel LGP, correspond to the peripheral hole SUPH or the inner hole Sc of the support plate SUP, and correspond to the inner outlet KC0 and the outer outlet KC1 of the keycap KCC. Furthermore, the micro-structure regions MS/OMS/IMS may overlap with the surrounding rib Sr0, the bridge rib Sr1 or the support frame Sf. Although these positions cannot emit light, the micro-structure regions MS/OMS/IMS can help guide the light that escapes from the light guide panel LGP into the light guide panel LGP for recycling, such that it is helpful for enhancing the illuminating effect of the light emitted from the outer side or even another adjacent keyswitch KS. Needless to say, the aforesaid micro-structure regions MS/OMS/IMS may also overlap with the second reflective layer RL2 of the shielding sheet SS (including the inner reflective section RL0 and the outer frame of the second reflective layer RL2), and that is also helpful to recycle light into the light guide panel LGP.

The shielding sheet SS is disposed above the micro-structure regions MS. The shielding sheet SS includes a mask layer ML, a second reflective layer RL2 and a protection layer PL, wherein the mask layer ML, the second reflective layer RL2 and the protection layer PL may be stacked with each other by various manners. For example, each of the mask layer ML, the second reflective layer RL2 and the protection layer PL may be stacked on top, middle or bottom to form the shielding sheet SS. The mask layer ML is opaque. The second reflective layer RL2 may have reflective and translucent characteristics at the same time, i.e., the second reflective layer RL2 may reflect part of the light and allow part of the light to pass through. The mask layer ML may be black ink and the second reflective layer RL2 may be white ink, but the present invention is not so limited. In this embodiment, the mask layer ML has a mask layer hole MLH and an inner mask layer ML0 located in the mask layer hole MLH, and the second reflective layer RL2 has a reflective layer hole RLH and an inner reflective section RL0 located in the reflective layer hole RLH. The mask layer hole MLH may be larger than, equal to or smaller than the reflective layer hole RLH, and the inner mask layer ML0 may be larger than, equal to or smaller than the inner reflective section RL0, wherein it depends on the desired illuminating effect. The inner mask layer ML0 and the inner reflective section RL0 are located above the lighting unit LED. In this embodiment, the inner mask layer ML0 and/or the inner reflective section RL0 above the lighting unit LED is at least partially projected between the two non-intersecting traces LT, HT or between the two non-intersecting traces STa, STb.

Each of the keyswitches KS includes a part of the support plate SUP. In this embodiment, the support plate SUP has an inner hole Sc, a surrounding rib Sr0, a plurality of bridge ribs Sr1 and a support frame Sf, wherein the surrounding rib Sr0 surrounds the inner hole Sc, and the bridge ribs Sr1 connect the surrounding rib Sr0 and the support frame Sf. Furthermore, there are a plurality of peripheral holes SUPH between the bridge ribs Sr1, the surrounding rib Sr0 and the support frame Sf. In this embodiment, the two inner micro-structure regions IMS at least partially overlap with projections of the inner hole Sc, the surrounding rib Sr0, the bridge ribs Sr1 and/or the support frame Sf. Still further, the two outer micro-structure regions OMS at least partially overlap with the projections of the surrounding rib Sr0, the plurality of bridge ribs Sr1 and/or the support frame Sf.

The keyswitch KS includes a keycap KCC, a support mechanism SSR, a circuit board MEM and the support plate SUP. The keycap KCC is disposed with respect to the support plate SUP. The keycap KCC has an inner outlet KC0 and a plurality of outer outlets KC1, wherein the inner outlet KC0 and the outer outlets KC1 are surrounded by an opaque area KC2. The positions of the inner outlet KC0 and the outer outlets KC1 correspond to the positions of the inner hole Sc and the peripheral holes SUPH of the support plate SUP, such that the light emitted by the lighting unit LED may be projected from the inner outlet KC0 and the outer outlets KC1 of the keycap KCC through the light guide panel LGP, the shielding sheet SS, the inner hole Sc and the peripheral holes SUPH of the support plate SUP. The support mechanism SSR is disposed between the keycap KCC and the support plate SUP. When the keycap KCC is pressed, the keycap KCC will move vertically toward the support plate SUP along with the support mechanism SSR. Furthermore, a restoration member (not shown) may be further disposed between the keycap KCC and the support plate SUP, wherein the restoration member may be, but is not limited to, a rubber dome. The circuit board MEM may have a switch (e.g., membrane switch or other trigger switches) corresponding to the keyswitch KS.

From top view, the lighting unit LED, the panel hole L0, the inner reflective section RL0, the inner mask layer ML0, the inner hole Sc, the inner outlet KC0 and the adhesive around the panel hole L0 may be located between the two non-intersecting traces LT, HT and/or STa, STb.

From top view, the lighting unit LED, the panel hole L0, the inner reflective section RL0, the inner mask layer ML0, the inner hole Sc, the inner outlet KC0 and the adhesive around the panel hole L0 may be located between the two inner micro-structure regions IMS.

As shown in FIG. 4, the backlight module BLM further includes a protrusion structure BP, wherein the position of the protrusion structure BP corresponds to the position of the lighting unit LED, and the protrusion structure BP is located between the two non-intersecting traces LT, HT. Furthermore, the protrusion structure BP is also located between the micro-structure regions MS, i.e., the protrusion structure BP is located between the two inner micro-structure regions IMS and also located between the two outer micro-structure regions OMS. In this embodiment, the protrusion structure BP is formed on the lighting board LCB and the protrusion structure BP forms a notch IP for accommodating the lighting unit LED, such that an upper surface of the lighting unit LED is flush with or lower than the upper surface of the light guide panel LGP and higher than a lower surface of the light guide panel LGP. Since the shielding sheet SS is disposed on the light guide panel LGP, the upper surface of the lighting unit LED is also flush with or lower than a lower surface of the shielding sheet SS, such that the shielding sheet SS can be kept flat and will not be pushed by the lighting unit LED to partially enter the inner hole Sc of the support plate SUP. Accordingly, the amount of light emitted by the lighting unit LED entering the light guide panel LGP can be increased, so as to enhance the overall illuminating consistency. Moreover, the circuit board MEM may have a switch disposed with respect to the inner hole Sc of the support plate SUP, such that the switch may partially enter the inner hole Sc of the support plate SUP without interfering with the shielding sheet SS and the lighting unit LED below the shielding sheet SS.

Figure 5:
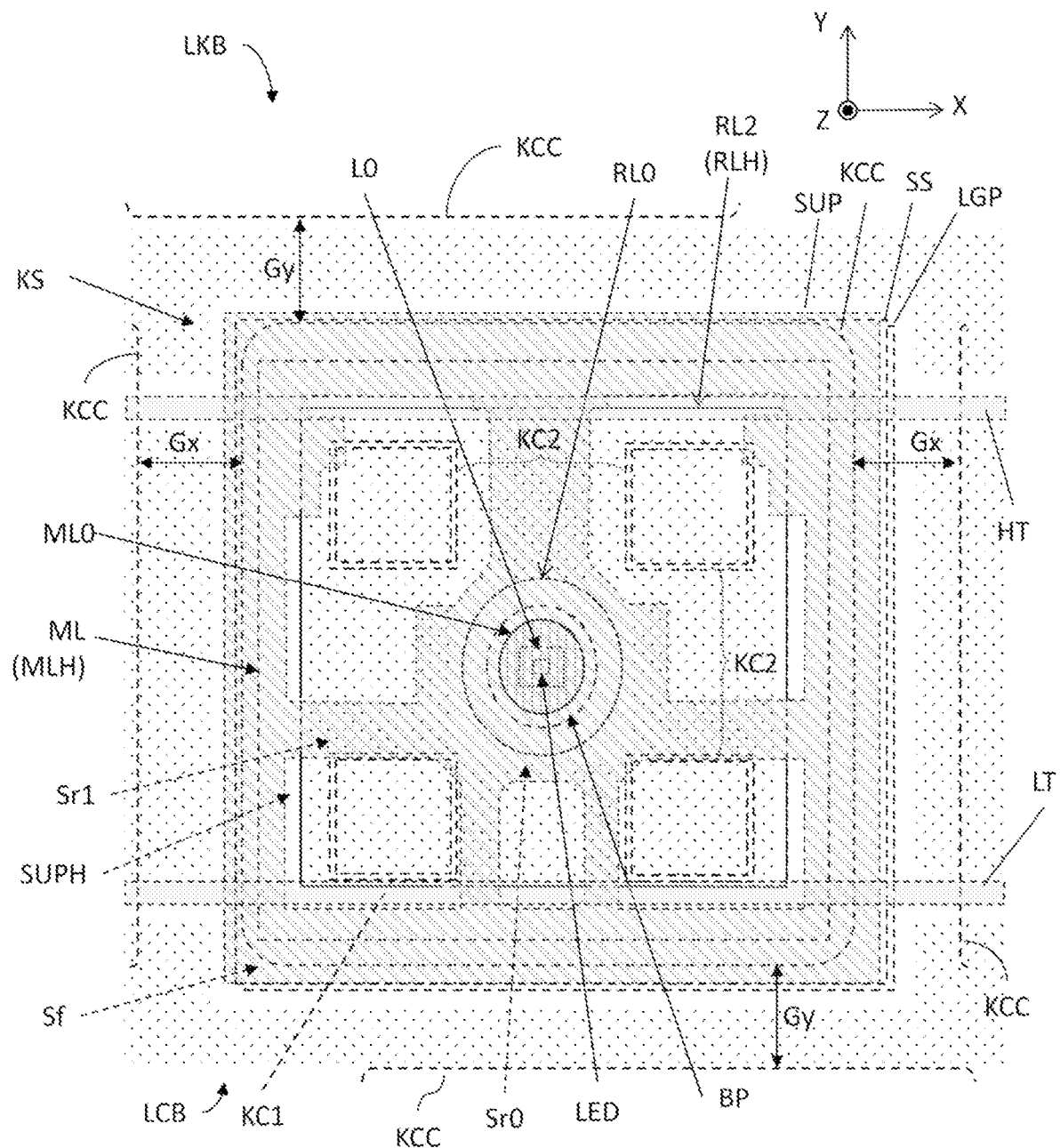
FIG. 5 is a partial top view illustrating a lighting keyboard according to another embodiment of the invention.
Figure 6:
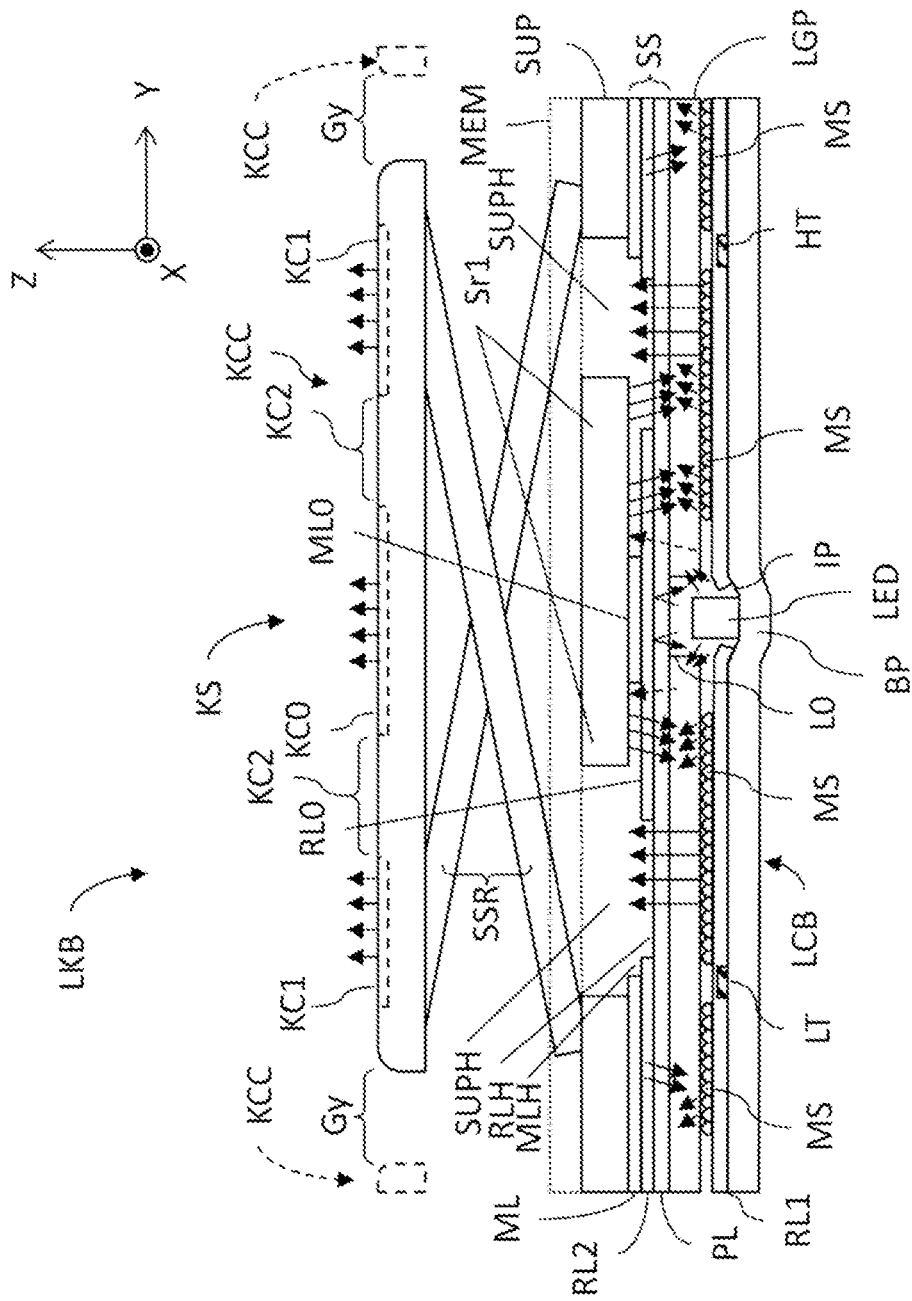
FIG. 6 is a partial sectional view illustrating the lighting keyboard shown in FIG. 5.

Referring to FIGS. 5 and 6, FIG. 5 is a partial top view illustrating the lighting keyboard LKB according to another embodiment of the present invention, and FIG. 6 is a partial sectional view illustrating the lighting keyboard LKB shown in FIG. 5.

As shown in FIGS. 5 and 6, the support plate SUP may not have the aforesaid inner hole Sc. At this time, the shielding sheet SS is kept flat and will not be pushed by the lighting unit LED. When the support plate SUP does not have the inner hole Sc, the keycap KCC may have no inner outlet KC0. However, if the keycap KCC has the inner outlet KC0, the peripheral holes SUPH around the central area of the keycap KCC may be used to emit light, such that the light is projected from the inner outlet KC0 without the inner hole Sc. In this embodiment, the two non-intersecting traces HT, LT may overlap with a projection of at least one of the at least one outer outlet KC1. As long as the two non-intersecting traces HT, LT meet at least one of the following three conditions, the traces HT, LT will not affect the light emitted from the outer outlet KC1 of the keycap KCC. Condition 1: the two non-intersecting traces HT, LT overlap with projections of the surrounding rib Sr0, the bridge ribs Sr1 and/or the support frame Sf. Condition 2: the two non-intersecting traces HT, LT overlap with projections of the mask layer ML and/or the second reflective layer RL2 of the shielding sheet SS. Condition 3: the two non-intersecting traces HT, LT overlap with projections of the opaque area KC2 of the keycap KCC.

Figure 7:
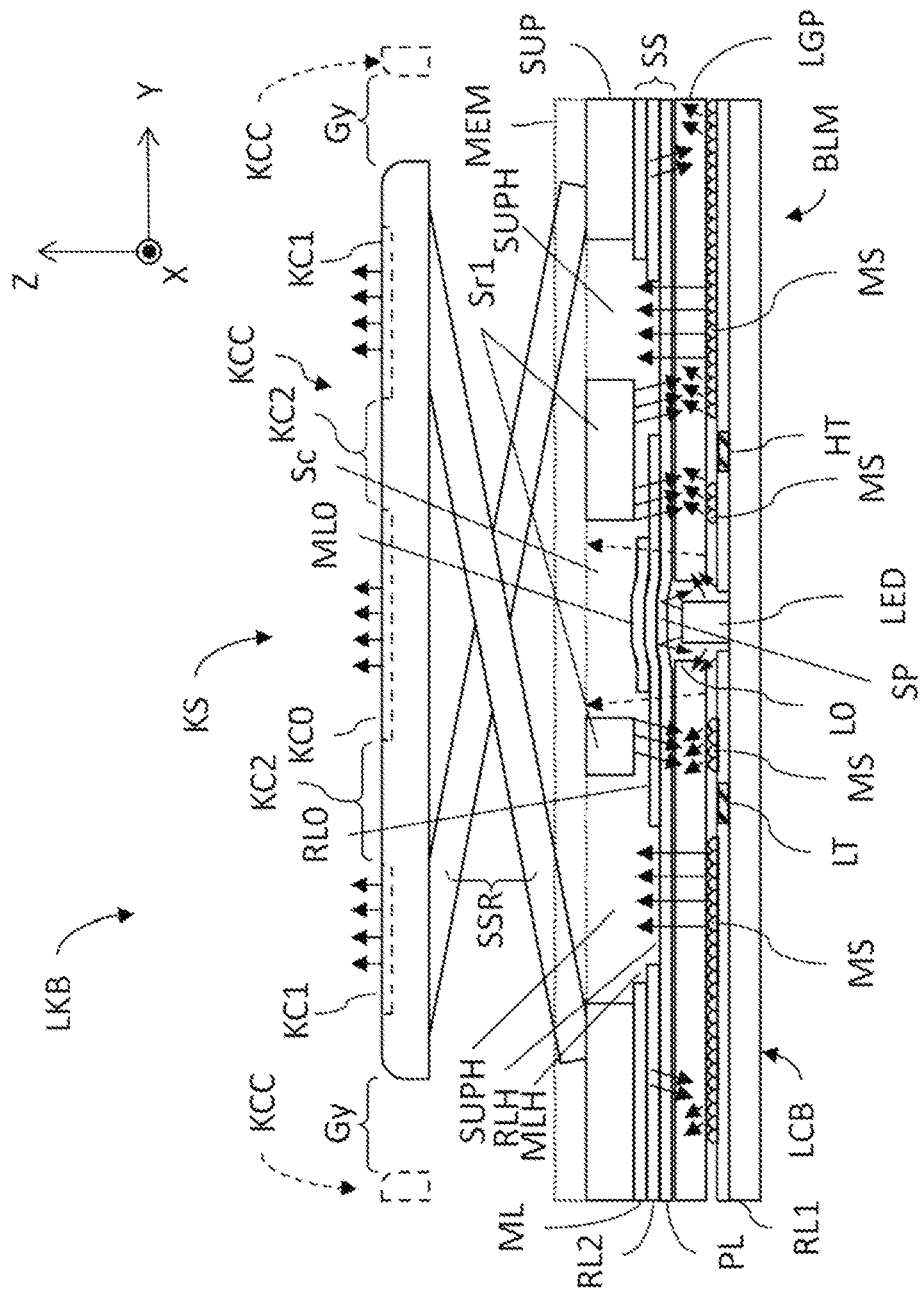
FIG. 7 is a partial sectional view illustrating a lighting keyboard according to another embodiment of the invention.

Referring to FIG. 7, FIG. 7 is a partial sectional view illustrating the lighting keyboard LKB according to another embodiment of the present invention.

As shown in FIG. 7, a protrusion structure SP of the backlight module BLM may be formed on the shielding sheet SS, wherein the lighting unit LED is located below the protrusion structure SP. The position of the protrusion structure SP corresponds to the position of the lighting unit LED, and the protrusion structure SP is located between the two non-intersecting traces LT, HT. Furthermore, the protrusion structure SP is also located between the micro-structure regions MS, i.e., the protrusion structure SP is located between the two inner micro-structure regions IMS and also located between the two outer micro-structure regions OMS. In this embodiment, the protrusion structure SP may be lower than or slightly enter the inner hole Sc of the support plate SUP, and an upper surface of the lighting unit LED is flush with or lower than an upper surface of the light guide panel LGP or a lower surface of the shielding sheet SS. To be noted, the protrusion structure SP can be pressed back to make the top of the shielding sheet SS below the support plate SUP have a flat surface. In FIG. 7, since the protrusion structure SP is formed on the shielding sheet SS, the second reflective layer RL0 of the shielding sheet SS above the lighting unit LED forms a curved surface or an inclined surface due to the protrusion structure SP. Because the reflection angle provided by the flat second reflective layer RL0 is small, it is difficult to guide the light emitted upward to directly enter the wall of the panel hole L0 of the light guide panel LGP.

Figure 8:
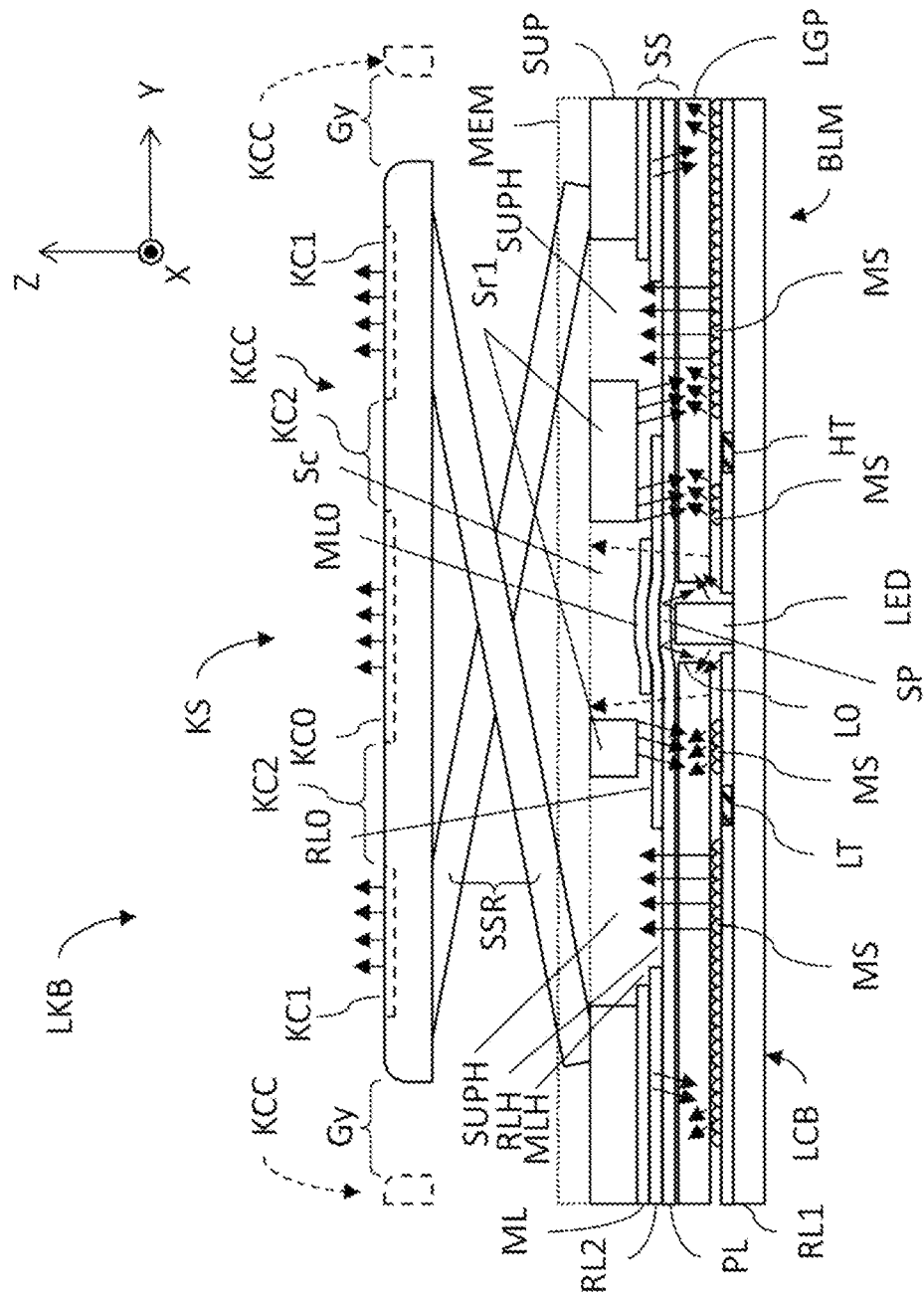
FIG. 8 is a partial sectional view illustrating a lighting keyboard according to another embodiment of the invention.

Referring to FIG. 8, FIG. 8 is a partial sectional view illustrating the lighting keyboard LKB according to another embodiment of the present invention.

As shown in FIG. 8, an upper surface of the lighting unit LED may be higher than an upper surface of the light guide panel LGP and lower than a lower surface of the shielding sheet SS, i.e., the upper surface of the lighting unit LED may be located between the upper surface of the light guide panel LGP and the lower surface of the shielding sheet SS. In other words, if necessary, the upper surface of the lighting unit LED may exceed the upper surface of the light guide panel LGP. For example, the protrusion structure SP protrudes upward may release the thickness of the shielding sheet SS itself and the thickness of the adhesive layers above and below the shielding sheet SS to provide a space for accommodating the lighting unit LED. At this time, the upper surface of the lighting unit LED is located between the lower surface of the support plate SUP and the upper surface of the light guide panel LGP. Accordingly, when the upper surface of the lighting unit LED is higher than the upper surface of the light guide panel LGP, the protrusion structure SP may provide a space for accommodating the lighting unit LED, so as to prevent the lighting unit LED from interfering with the shielding sheet SS.

Figure 9:
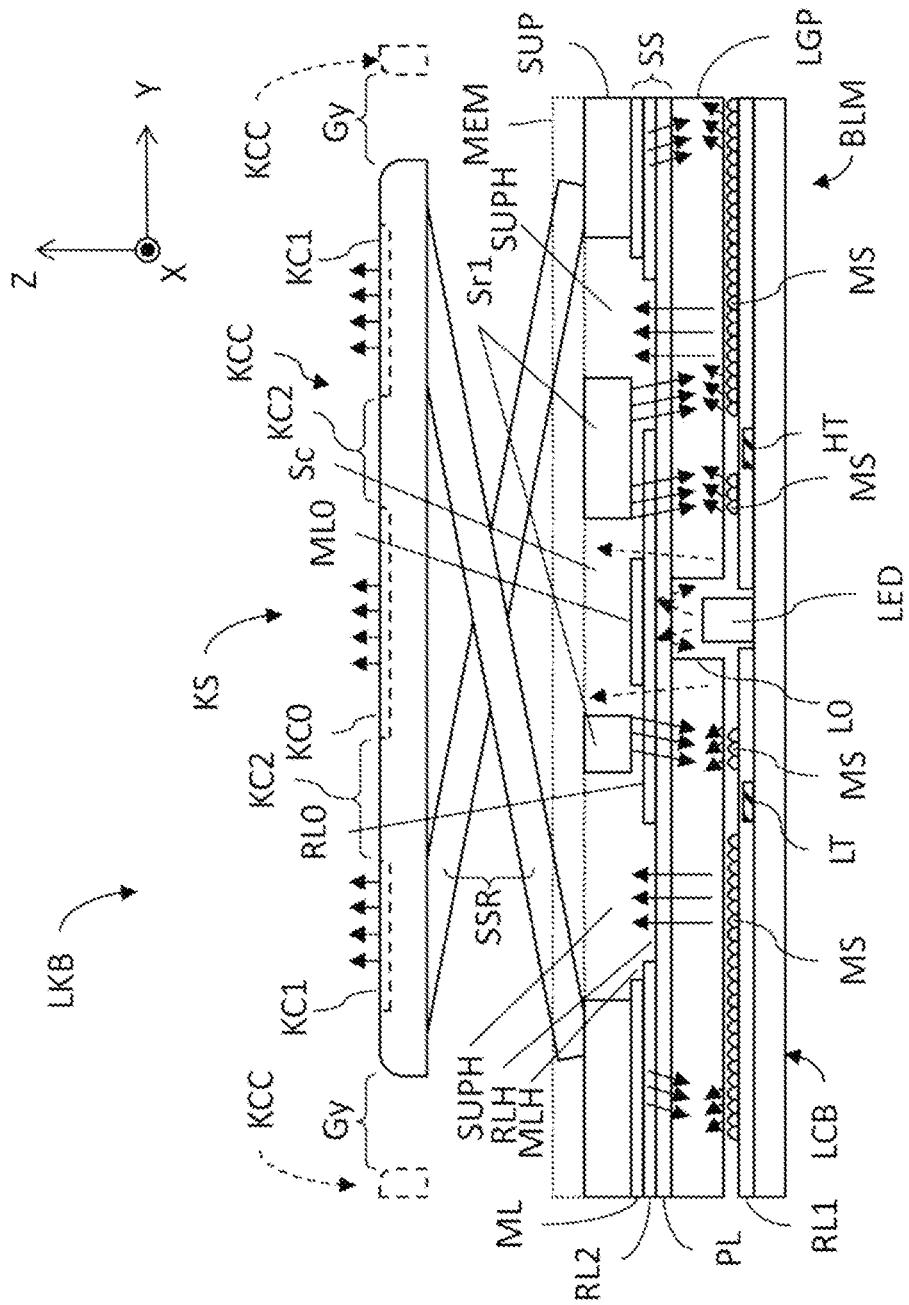
FIG. 9 is a partial sectional view illustrating a lighting keyboard according to another embodiment of the invention.

Referring to FIG. 9, FIG. 9 is a partial sectional view illustrating the lighting keyboard LKB according to another embodiment of the present invention.

As shown in FIG. 9, the lighting keyboard LKB may not include the protrusion structure BP shown in FIG. 4 or the protrusion structure SP shown in FIG. 7. In this embodiment, an upper surface of the lighting unit LED is flush with or lower than an upper surface of the light guide panel LGP and higher than a lower surface of the light guide panel LGP. Accordingly, the amount of light emitted by the lighting unit LED entering the light guide panel LGP can be increased, so as to enhance the overall illuminating consistency.

Figure 10:
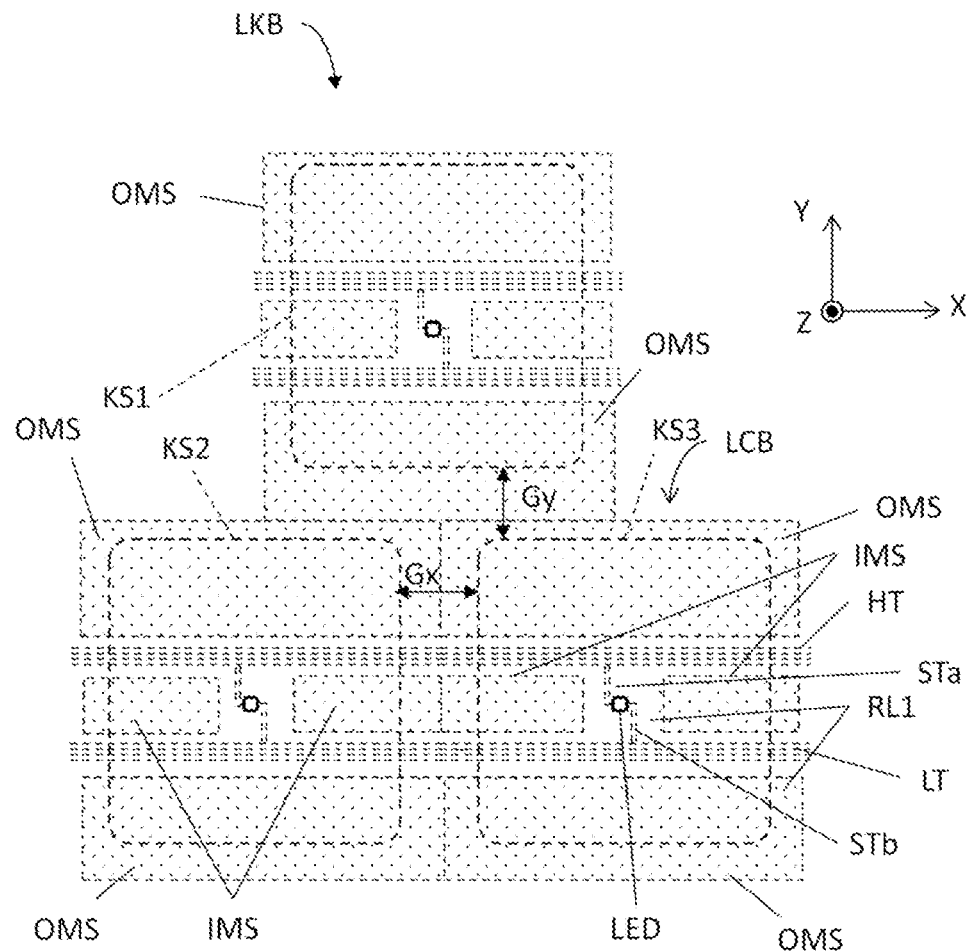
FIG. 10 is another partial top view illustrating the lighting keyboard shown in FIG. 1.

Referring to FIG. 10, FIG. 10 is another partial top view illustrating the lighting keyboard LKB shown in FIG. 1.

As shown in FIG. 10, at least parts of the micro-structure regions OMS, IMS overlap with the gaps Gx, Gy between any two adjacent keyswitches KS1, KS2, KS3. Three adjacent keyswitches KS1, KS2, KS3 may have three adjacent outer micro-structure regions OMS, wherein the three adjacent outer micro-structure regions OMS are joined together in the X and Y directions. The two outer micro-structure regions OMS disposed outside two non-intersecting traces of the lighting board LCB under a keyswitch KS may have the same pattern, which may have the same size, the same shape and the same distance (outside the traces) in two identical regions. Within the projected range of a single keyswitch KS (e.g., square key), the two outer micro-structure regions OMS may have different patterns defined by the keyswitch KS. For two adjacent keyswitches KS in the Y direction, the two outer micro-structure regions OMS may have different patterns defined by the two adjacent keyswitches KS.

Figure 11:
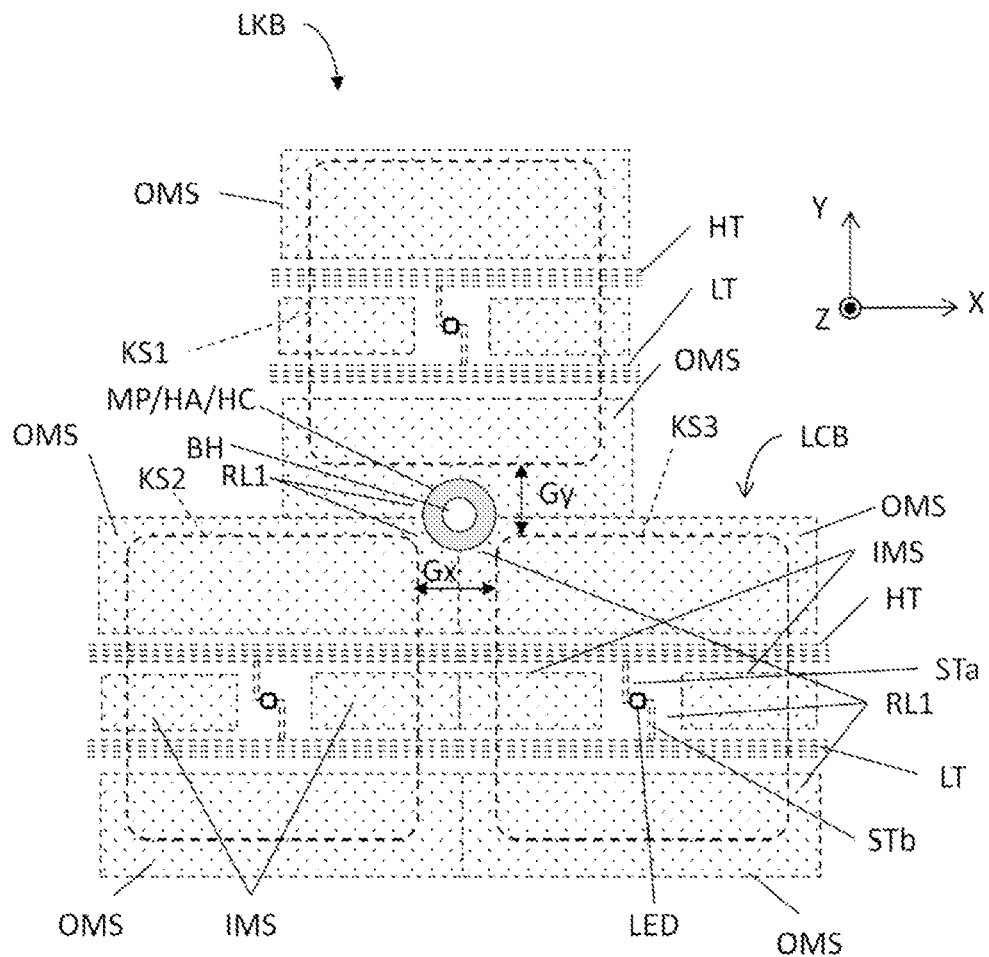
FIG. 11 is another partial top view illustrating the lighting keyboard shown in FIG. 1.

Referring to FIG. 11, FIG. 11 is another partial top view illustrating the lighting keyboard LKB shown in FIG. 1.

As shown in FIG. 11, a board hole BH may be formed on the lighting board LCB, wherein the board hole BH is used for fixing or heat dissipation. A mask portion MP may be disposed on the lighting board LCB, wherein the mask portion MP surrounds the board hole BH and is used to shield and absorb light, so as to prevent the light from leaking from the board hole BH. In practice, the mask portion MP may be a light absorbing or opaque substrate of the lighting board LCB, i.e., the first reflective layer RL1, a trace layer and an insulating layer (if necessary) above the substrate of the lighting board LCB are all formed with corresponding holes larger than the board hole BH, so as to expose the mask portion MP surrounding the board hole BH. Another manner in practice is to coat a layer of mask portion MP on the upper surface of the first reflective layer RL1 of the lighting board LCB to surround the board hole BH. At this time, the hole size of the first reflective layer RL1 is similar to the board hole BH. The board hole BH and the mask portion MP on the lighting board LCB may correspond to a board hole and a mask portion (not shown) on the shielding sheet SS. A hole adhesive HA on the lighting board LCB may be disposed on the mask portion MP and surround the board hole BH. A hole clearance HC does not overlap with the outer micro-structure regions OMS or any micro-structure. The hole clearance HC without the first reflective layer RL1 may be defined between the first reflective layer RL1 and the board hole BH. The hole clearance HC without an adhesive may be defined between the hole adhesive HA and the board hole BH. The inner micro-structure regions (between the two non-intersecting traces HT, LT and/or between the two non-intersecting traces STa, STb) do not overlap with the board hole BH, the hole adhesive HA and/or the hole clearance HC. A plurality of adjacent keyswitches KS1, KS2, KS3 in the X and/or Y direction may have adjacent outer micro-structure regions OMS that jointly surround the mask portion MP, the board hole BH, the hole adhesive HA and/or the hole clearance HC. The mask portion MP, the board hole BH, the hole adhesive HA and/or the hole clearance HC is located between the traces HT, LT corresponding to the keyswitch KS1 and the traces HT, LT correspond to the keyswitches KS2, KS3. For further explanation, the mask portion MP, the board hole BH, the hole adhesive HA and/or the hole clearance HC may be located between the trace LT corresponding to the keyswitch KS1 and the trace HT correspond to the keyswitches KS2, KS3. It should be noted that the mask portion MP, the hole adhesive HA and the hole clearance HC are schematically illustrated at the same position shown in FIG. 11. However, the definitions of the mask portion MP, the hole adhesive HA and the hole clearance HC can be clearly understood from the above description.

As mentioned in the above, the present invention makes the plurality of micro-structure regions on the lighting board not overlap with the two non-intersecting traces. Accordingly, the micro-structure regions specifically arranged on the lighting board can be used to recycle light or assist light output, so as to enhance the overall illuminating consistency. Furthermore, although the technical feature of the present invention is depicted to solve the problem of low power lighting unit, the present invention is also applicable to an application of medium or high power lighting unit in a backlight module.

Furthermore, although the light guide panel helps to transmit light near the edge of the keycap KCC, other problems may occur in the application of the color illuminated keyboard LKB. For example, in FIGS. 10 and 11, a plurality of keyswitches KS1/KS2/KS3 is arranged adjacently. When the adjacent keyswitches KS1/KS2/KS3 need to emit different color lights, unnecessary light leakage of the adjacent keyswitches KS1/KS2/KS3 through the light guide panel LGP causes discoloration, and also causes the dim color lighting effect of the adjacent keyswitches KS1/KS2/KS3 with insufficient chroma and saturation. The following embodiments of the present invention will introduce several technical solutions to solve the aforesaid problems.

Figure 12A:
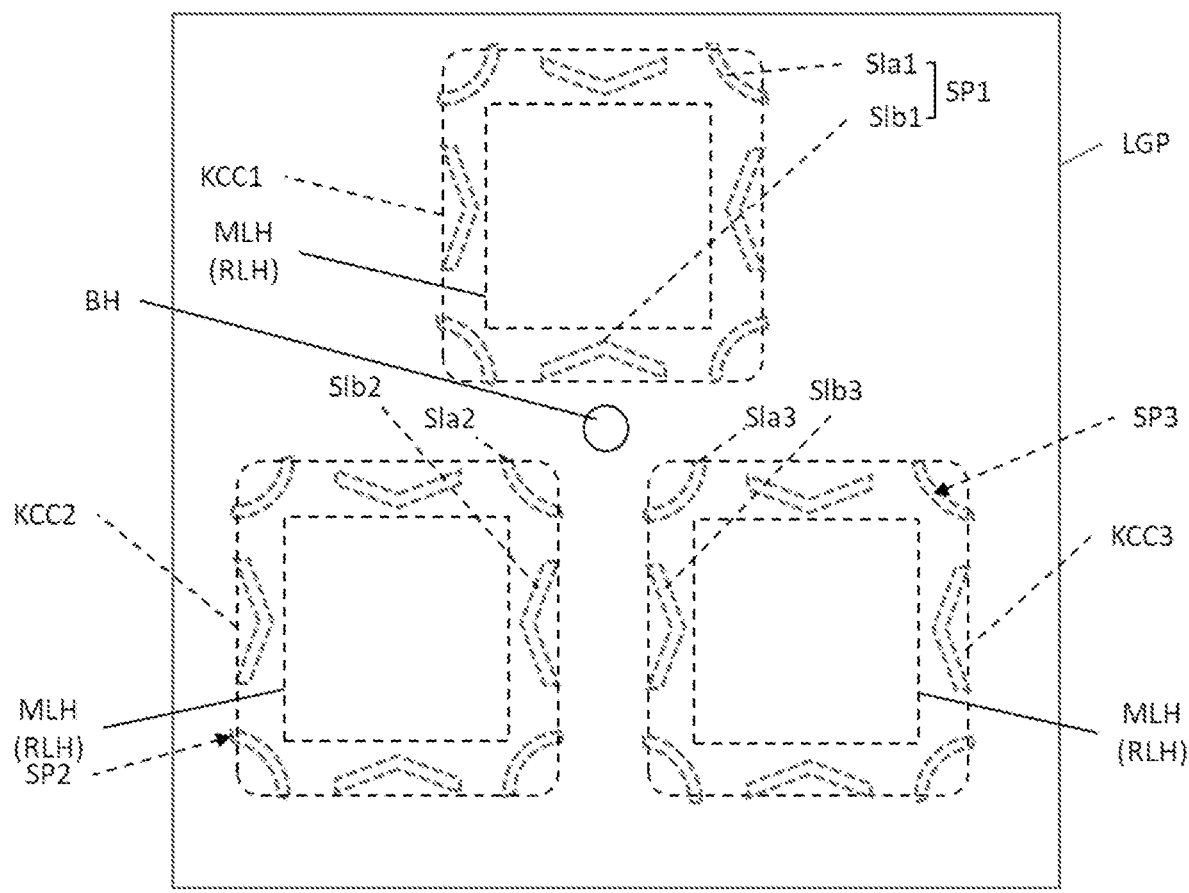
FIG. 12A is a partial top view of a slot pattern of a light guide panel of a backlight module according to another embodiment of the present invention.
Figure 12B:
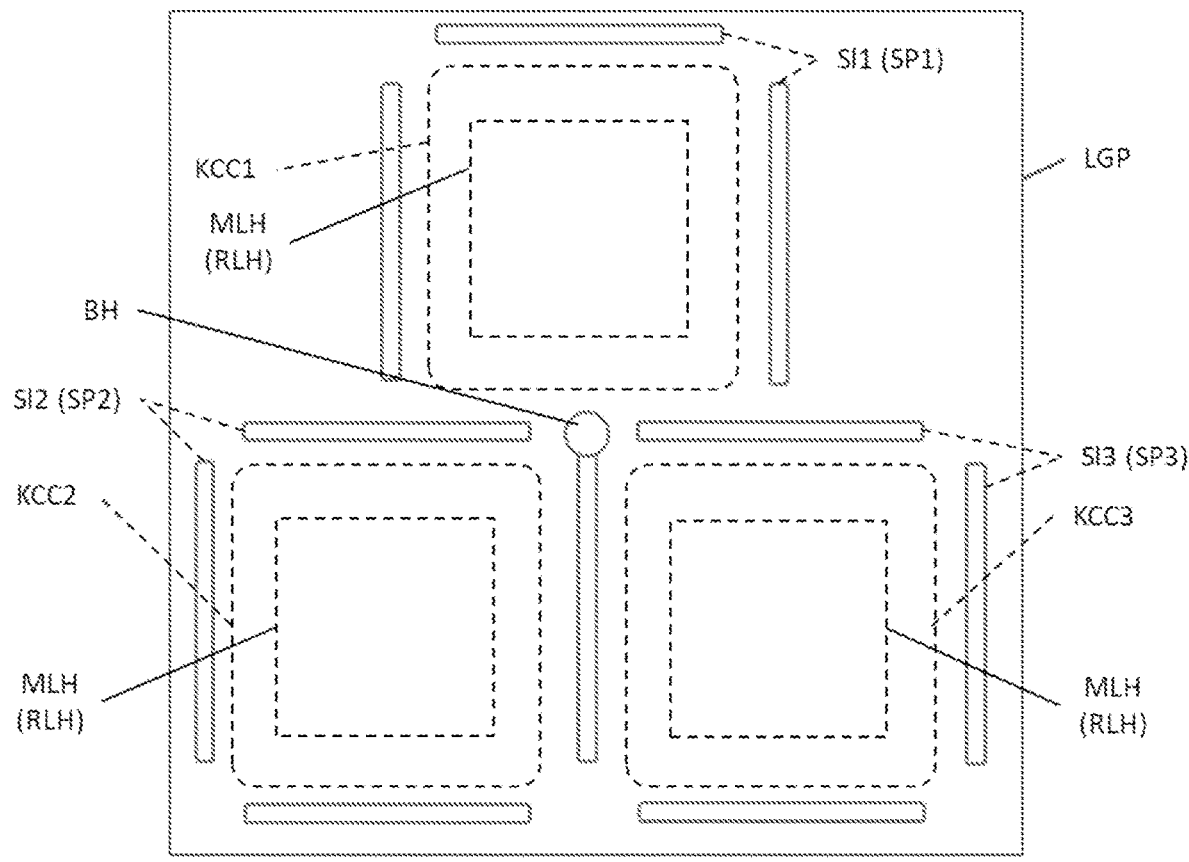
FIG. 12B is a partial top view of another slot pattern of the light guide panel of the backlight module according to another embodiment of the present invention.
Figure 13:
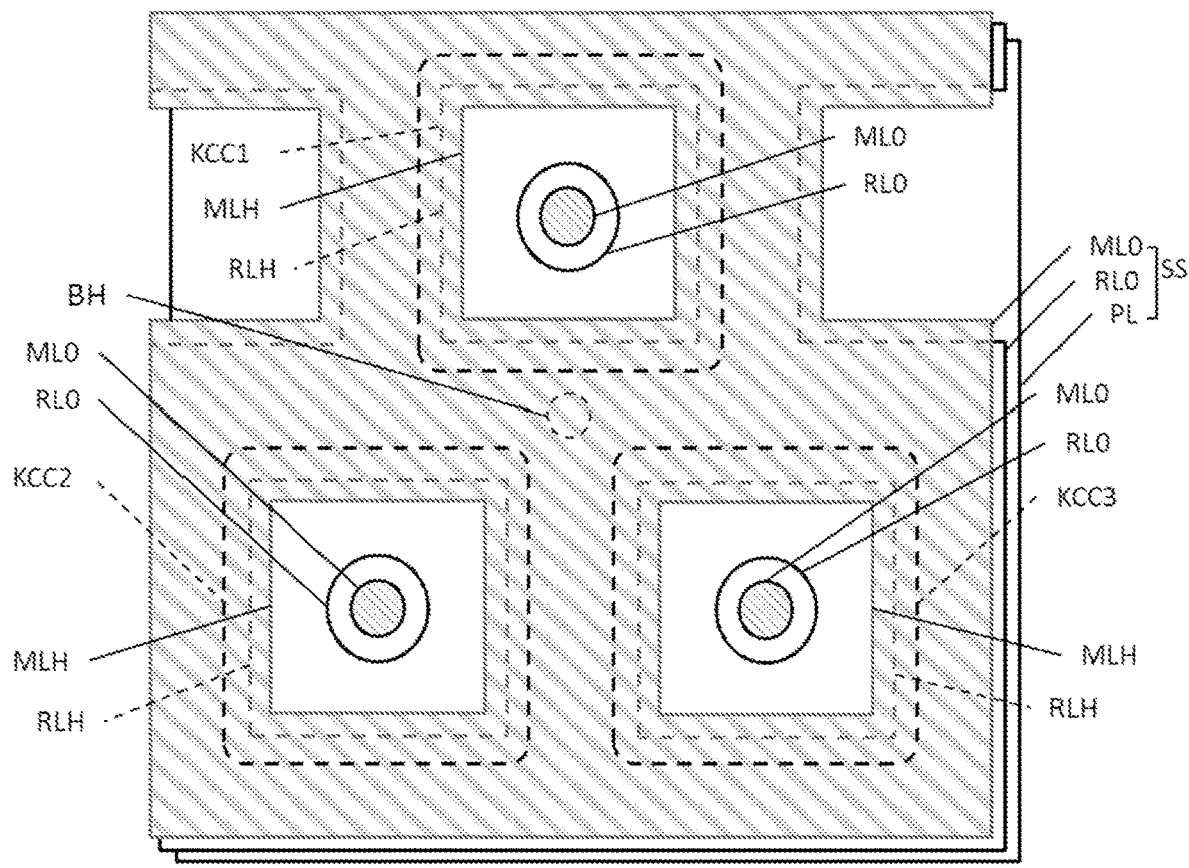
FIG. 13 is a partial top-view exploded diagram of s shielding sheet applied to the embodiments shown in FIG. 12A and FIG. 12B of the present invention.

Referring to FIG. 12A, FIG. 12B, and FIG. 13, FIG. 12A is a partial top view of a slot pattern SP of the light guide panel LGP of the backlight module BLM according to another embodiment of the present invention, FIG. 12B is a partial top view of another slot pattern SP of the light guide panel LGP of the backlight module BLM according to another embodiment of the present invention, and FIG. 13 is a partial top-view exploded diagram of the shielding sheet applied to the embodiments shown in FIG. 12A and FIG. 12B of the present invention.

In FIG. 12A and FIG. 13, the light guide panel LGP has a slot pattern SP1/SP2/SP3 disposed corresponding to each keycap KCC1/KCC2/KCC3 to surround the reflective layer hole RLH or the mask layer hole MLH of the shielding sheet SS in FIG. 13. The slot pattern SP1 includes a plurality of slots Sla1 and Slb1 arranged around the reflective layer hole RLH and/or the mask layer hole MLH corresponding to the keycap KCC1. The slot pattern SP2 includes a plurality of slots Sla2 and Slb2 arranged around the reflective layer hole RLH and/or the mask layer hole MLH corresponding to the keycap KCC2. The slot pattern SP3 includes a plurality of slots Sla3 and Slb3 arranged around the reflective layer hole RLH and/or the mask layer hole MLH corresponding to the keycap KCC3. Each slot Sla1/Sla2/Sla3 and Slb1/Slb2/Slb3 of each slot pattern SP1/SP2/SP3 has three functions: blocking light, reflecting light and allowing light to exit. The slots Sla1/Sla2/Sla3 and Slb1/Slb2/Slb3 have air gaps, which can block light for solving the cross-key discoloration problem. The walls of the slots Sla1/Sla2/Sla3 and Slb1/Slb2/Slb3 can still provide total reflection within the critical angle range due to the characteristics of the light guide panel LGP, and the light reflection is helpful for recycling light and enhancing the chroma and saturation of color light of one single keyswitch. However, the light leakage problem caused by the slot patterns SP1/SP2/SP3 and the plurality of slots Sla1/Sla2/Sla3 and Slb1/Slb2/Slb3 needs to be solved.

Each slot pattern SP1/SP2/SP3 can be respectively disposed between the corresponding reflective layer hole RLH and an edge of the keycap KCC1/KCC2/KCC3; or each slot pattern SP1/SP2/SP3 can be respectively disposed between the corresponding mask layer hole MLH and the edge of the keycap KCC1/KCC2/KCC3. In other words, the slot patterns SP1/SP2/SP3 of the light guide panel LGP are correspondingly covered under the reflective layer RL2 or the mask layer ML of the shielding sheet SS in FIG. 13. Since sidewalls of the plurality of slots Sla1/Sla2/Sla3 and Slb1/Slb2/Slb3 of the slot patterns SP1/SP2/SP3 can allow light to exit, unnecessary upward light leakage can be avoided by covering the plurality of slots Sla1/Sla2/Sla3 and Slb1/Slb1/Sla3 of each slot pattern SP1/SP2/SP3 under the reflective layer RL2 or the mask layer ML of the shielding sheet SS. In addition, covering the plurality of slots Sla1/Sla2/Sla3 and Slb1/Slb2/Slb3 of each slot pattern SP1/SP2/SP3 under the reflective layer RL2 of the shielding sheet SS can further reflect the recycled light back to the light guide panel LGP for lateral transmission.

In FIG. 12A, the slots Sla1/Sla2/Sla3 and Slb1/Slb2/Slb3 may pass through the light guide panel LGP or have a depth smaller than the thickness of the light guide panel LGP. The slots Sla1/Sla2/Sla3 correspond to the sides of the reflective layer holes RLH and/or the mask layer holes MLH, or correspond to the sides of the keycaps KCC1/KCC2/KCC3. The slots Slb1/Slb2/Slb3 correspond to the corners of the reflective layer holes RLH and/or the mask layer holes MLH, or correspond to the corners of the keycaps KCC1/KCC2/KCC3. The slots Sla1/Sla2/Sla3 and Slb1/Slb2/Slb3 can have different shapes. For example, the slots Sla1/Sla2/Sla3 may have a bending angle, such as 120 degrees-160 degrees. The slots Slb1/Slb2/Slb3 may be arc-shaped. The protruding ends of the slots Sla1/Sla2/Sla3 and Slb1/Slb2/Slb3 are all facing inward, such as toward the lighting unit LED, so as to reflect light to travel inward and away from the edges of the keycaps KCC1/KCC2/KCC3.

The slots SI1/SI2/SI3 of the slot patterns SP1/SP2/SP3 in FIG. 12B have several differences from the slots Sla1/Sla2/Sla3 and Slb1/Slb2/Slb3 in FIG. 12A. First, the slots SI1/SI2/SI3 in FIG. 12B are located in the gaps between the keycaps KCC1/KCC2/KCC3, that is, they are farther away from the lighting units LED and closer to the adjacent keycaps KCC1/KCC2/KCC3. If the blocking/reflecting effects of the slots SI1/SI2/SI3 are not good, there may be more light leakage than that in FIG. 12A. However, since the slots SI1/SI2/SI3 in FIG. 12B are disposed in the gaps between the keycaps KCC1/KCC2/KCC3, the light emitting paths of the lighting units LED within the orthographic projection ranges of on the keycaps KCC1/KCC2/KCC3 are longer to provide light for the keycaps KCC1/KCC2/KCC3, but the closer to the edges of the keycaps KCC1/KCC2/KCC3, the less and weaker the light is. Secondly, the slots SI1/SI2/SI3 in FIG. 12B are all linear, which are parallel to or correspond to the sides of the reflective layer holes RLH and/or the sides of the mask layer holes MLH (or are parallel to or correspond to the sides of the keycaps KCC1/KCC2/KCC3). The linear slots SI1/SI2/SI3 may provide a weaker reflection effect, which may need to be improved through curved or polygonal vertical cut surfaces. In addition, any of the slots SI1/SI2/SI3 can be selectively connected to the board hole BH of the backlight module BLM. When the slots SI1/SI2/SI3 are connected to the board hole BH, the light blocking effect is better. In addition, the light guide panel LGP is usually made of high polymer material, and obvious expansion and contraction of the light guide panel LGP may occur due to the temperature variations. When the slots SI1/SI2/SI3 are connected to the board hole BH, the aforesaid influence caused by the temperature variations can be reduced.

On the whole, the light transmitted by the lighting unit LED to the edges of the keycaps KCC1/KCC2/KCC3 may have a relatively large proportion of total reflection and lateral transmission. How to reflect, recycle and turn the light before reaching the plurality of slots Sla1/Sla2/Sla3 and Slb1/Slb2/Slb3 of the slot patterns SP1/SP2/SP3 is the problem desired to be solved in the present invention. Furthermore, how to reduce the light to be incident into the adjacent keycaps KCC1/KCC2/KCC3 again when the light is still emitted through the side walls of the plurality of slots Sla1/Sla2/Sla3 and Slb1/Slb2/Slb3 of the slot patterns SP1/SP2/SP3 is also a problem to be further solved in the present invention.

Figure 14:
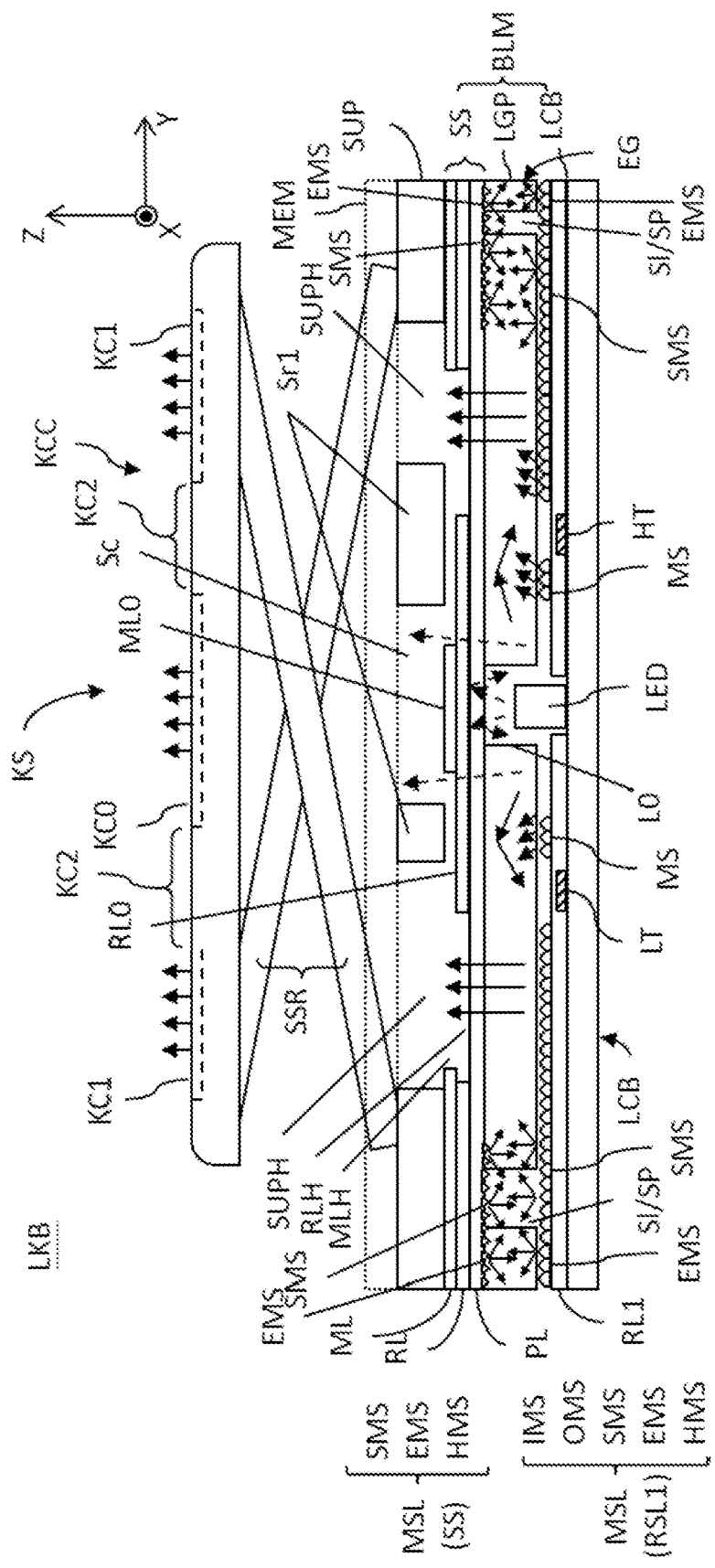
FIG. 14 is a partial cross-sectional diagram of a lighting keyboard according to another embodiment of the present invention.
Figure 15:
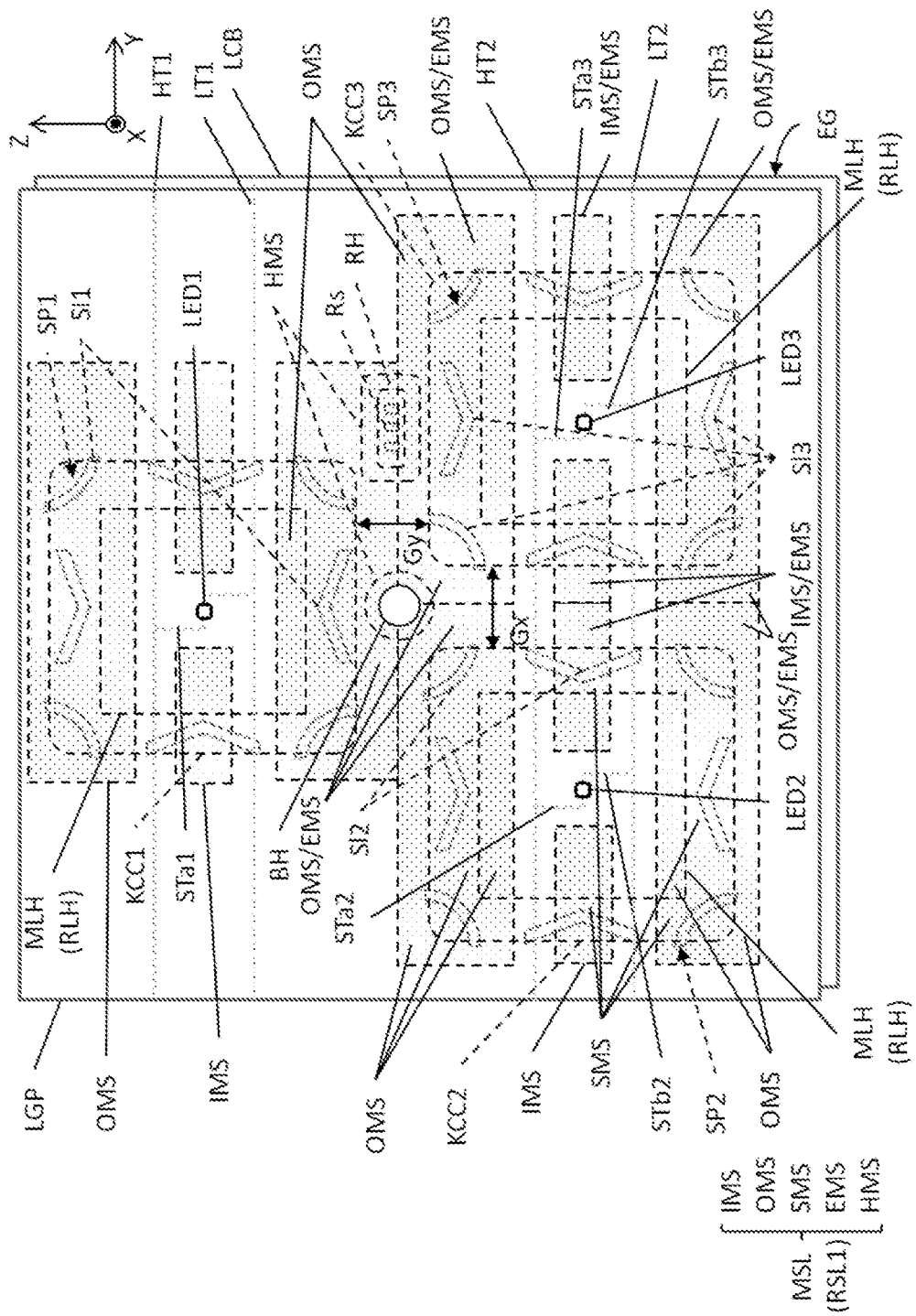
FIG. 15 is a partial top view of a light guide panel and a lighting board of a backlight module in FIG. 14.

For solving the aforesaid problems, the technical solution provided by the present invention is to form slot micro-structure regions SMS and edge micro-structure regions EMS. Please refer to FIG. 14 and FIG. 15 together with FIG. 12A, FIG. 12B and FIG. 13. FIG. 14 is a partial cross-sectional diagram of a lighting keyboard according to another embodiment of the present invention, and FIG. 15 is a partial top view of a light guide panel and a lighting board of a backlight module in FIG. 14.

First, in the Z direction, the slot micro-structure region SMS can be respectively disposed between the slots SI/SI1/SI2/SI3, Sla1/Sla2/Sla3 and Slb1/Slb2/Slb3 and the reflective layer holes RLH; or, the slot micro-structure region SMS can be respectively disposed between the slots SI/SI1/SI2/SI3, Sla1/Sla2/Sla3 and Slb1/Slb2/Slb3 and the mask holes MLH. The slot micro-structure region SMS can be formed by a plurality of micro-structure regions MS on the first reflective layer RL1 of the lighting board LCB in the aforesaid embodiments, such as the inner micro-structure regions IMS or the outer micro-structure regions OMS. The slot micro-structure region SMS could be disposed in parallel to the light guide panel LGP.

The slot micro-structure region SMS may also be disposed on the shielding sheet SS and in parallel to the light guide panel LGP. In practice, a part of the reflective layer RL can form a micro-structure with a diffusion effect, or one micro-structure region MS can be independently disposed under the reflective layer RL. For example, the reflective layer RL could adopt ink with larger-sized reflective particles, and when the reflective layer RL is sprayed or printed, concave/convex areas or irregular reflective surfaces are formed simultaneously, so that the reflective layer RL itself can form the micro-structure regions MS as the slot micro-structure region SMS; or, an independent layer of micro-structure regions MS could be sprayed or printed under the reflective layer RL to form irregular reflective surfaces as the slot micro-structure region SMS.

Furthermore, the slot micro-structure region SMS (and the edge micro-structure region EMS and a hole micro-structure region HMS introduced later) can also be disposed on the upper/lower surface of the light guide panel LGP, which is not shown in the figure for making the figure simple and clear. The micro-structure regions on the surface of the light guide panel LGP can be laser-engraved or stamped concave/convex micro-dots of any shape, or micro-dots made of reflective paint. The slot micro-structure region SMS on the surface of the light guide panel LGP can destroy the total reflection and directly provide a diffusion effect, including turning partial light to travel inward. On the other hand, the slot micro-structure region SMS on the shielding sheet SS and the slot micro-structure region SMS on the lighting board LCB are used to diffuse the light emitted from the upper and lower surfaces of the light guide panel LGP, so that the light can be partially reflected, partially recycled and partially turned.

In such a manner, before the light transmitted laterally from the light guide panel LGP reaches the slots SI/SI1/SI2/SI3, Sla1/Sla2/Sla3 and Slb1/Slb2/Slb3, the light can be partially reflected, partially recycled and partially turned by the slot micro-structure region SMS on the shielding sheet SS, the slot micro-structure region SMS on the light guide panel LGP, and the slot micro-structure region SMS on the lighting board LCB, which can greatly weaken and reduce the light reaching the slots SI/SI1/SI2/SI3, Sla1/Sla2/Sla3 and Slb1/Slb2/Slb3 and further reduces the amount of the light incident into the adjacent keycaps KCC1/KCC2/KCC3.

At the same time, no matter the slot micro-structure region SMS is located on the first reflective layer RL1 of the lighting board LCB or located on the shielding sheet SS, the slot micro-structure region SMS can be further overlapped with the slots SI/SI1/SI2/SI3, Sla1/Sla2/Sla3 and Slb1/Slb2/Slb3. In the X direction, the slot patterns SP/SP1/SP2/SP3 or the slots SI/SI1/SI2/SI3, Sla1/Sla2/Sla3 and Slb1/Slb2/Slb3 are covered by the shielding sheet SS and the first reflective layer RL1 of the lighting board LCB. If necessary, the slot patterns SP/SP1/SP2/SP3 or the slots SI/SI1/SI2/SI3, Sla1/Sla2/Sla3 and Slb1/Slb2/Slb3 could be selectively covered by the two slot micro-structure regions SMS on the shielding sheet SS and the first reflective layer RL1 of the lighting board LCB. The light entering the slots SI/SI1/SI2/SI3, Sla1/Sla2/Sla3 and Slb1/Slb2/Slb3 can be partially reflected, partially recycled and partially turned by the overlapped slot micro-structure regions SMS again, so as to further reduce the amount of light incident into the adjacent keycaps KCC1/KCC2/KCC3 together with the blocking effect provided by the air gap.

The edge micro-structure region EMS is disposed outside the slots SI/SI1/SI2/SI3, Sla1/Sla2/Sla3 and Slb1/Slb2/Slb3 on the light emitting path of the lighting unit LED. The edge micro-structure region EMS can be implemented on the lighting board LCB, the shielding sheet SS and the light guide panel LGP in the same manner as the slot micro-structure region SMS. In addition, since the slot micro-structure region SMS and the edge micro-structure region EMS are located before and after the slots SI/SI1/SI2/SI3, Sla1/Sla2/Sla3 and Slb1/Slb2/Slb3 on the light emitting path, it can also be said that the slots SI/SI1/SI2/SI3, Sla1/Sla2/Sla3 and Slb1/Slb2/Slb3 are surrounded and/or overlapped by the larger inner/outer micro-structure regions IMS/OMS.

According to the aforesaid configuration, in FIG. 15, the edge micro-structure region EMS located in the gap Gx between the keycaps KCC2/KCC3 can be achieved individually or jointly by any inner/outer micro-structure region IMS/OMS. The aforesaid edge micro-structure region EMS is located between a pair of slot patterns SP2/SP3, and the pair of slot patterns SP2/SP3 correspond to two adjacent keycaps KCC2/KCC3. In other words, the aforesaid edge micro-structure region EMS is located between at least one pair of slots SI2/SI3, and the at least one pair of slots SI2/SI3 partially surrounds two adjacent reflective layer holes RLH and/or two mask layer holes MLH. At the same time, the pair of slot patterns SP2/SP3, the edge micro-structure region EMS/inner micro-structure region IMS, the two adjacent reflective layer holes RLH and/or the two mask layer holes MLH are located between one set of the non-intersecting (main) traces HT2/LT2.

Similarly, the gap Gy between the keycaps KCC1 and KCC2/KCC3 can be achieved by the outer micro-structure region OMS. The edge micro-structure region EMS is located between three sets of slot patterns SP2/SP3, and the three sets of slot patterns SP2/SP3 correspond to three adjacent keycaps KCC1/KCC2/KCC3 and three adjacent lighting units LED1/LED2/LED3. In other words, the edge micro-structure region EMS/outer micro-structure region OMS is located between at least three slots SI1/SI2/SI3, and the at least three slots SI1/SI2/SI3 partially surround three adjacent reflective layer holes RLH or three mask layer holes MLH. The at least three slots SI1/SI2/SI3 could be located between three sets of non-intersecting (sub) traces STa1/STb1, STa2/STb2 and STa3/STb3; or, the at least three slots SI1/SI2/SI3 could be located between two sets of non-intersecting (main) traces HT1/LT1 and HT2/LT2. The two sets of non-intersecting (main) traces HT1/LT1 and HT2/LT2 respectively pass through (or are electrically connected to) the three adjacent lighting units LED1/LED2/LED3. The two sets of non-intersecting (main) traces HT1/LT1 and HT2/LT2 also pass through the three adjacent reflective layer holes RLH or the three mask layer holes MLH.

For the keycap KCC3, FIG. 15 also discloses a lighting board LCB combined with the light guide panel LGP. The lighting board LCB includes the light guide panel LGP, at least one pair of non-intersecting traces LT/HT (or STa/STb), at least two micro-structure regions IMS or OMS, and the lighting unit LED. The light guide panel LGP includes a panel hole L0 and at least two slots SI3. The at least one pair of non-intersecting traces LT/HT (or STa/STb) is located under the light guide panel LGP. The at least two micro-structure regions IMS (or OMS) are spaced apart from each other, and the at least two micro-structure regions IMS (or OMS) do not overlap the pair of non-intersecting traces LT/HT (or STa/STb). The lighting unit LED is located in the panel hole L0 and between the at least two micro-structure regions IMS (or OMS). The at least two slots SI3 are relatively disposed around the lighting unit LED, and the at least two micro-structure regions IMS (or OMS) are located between the at least two slots SI3. The at least two micro-structure regions IMS located between the at least two slots SI3 could be, for example, two inner micro-structure regions IMS within the reflective layer hole RLH/mask layer hole MLH of the shielding sheet SS corresponding to the keycap KCC3, or two outer micro-structure regions OMS within the reflective layer hole RLH/mask layer hole MLH.

Traditionally, those skilled in the art have a stereotype that the micro-structure may only be used in a region corresponding to a light emitting region (the reflective layer hole RLH and/or the mask layer hole MLH of the shielding sheet SS). Moreover, those skilled in the art also have a stereotype that the light-emitting/light-leakage region near a hole or edge of a light guide panel should intuitively utilize light-absorbing material instead of reflective material and the diffusion technology. The aforesaid and following embodiments of the present invention dispel these stereotyped concepts and achieve excellent technical effects on backlight module products with low-brightness lighting units and light guide panels.

In addition to the application for the adjacent keycaps KCC1/KCC2/KCC3, the aforesaid micro-structures can be further applied to reduce light leakage and recycle light, for example, to solve the light leakage problem at the board hole BH of the backlight module BLM (FIGS. 15-17) and the light leakage problem at the edge EG of the light guide panel LGP (FIGS. 14-17), recycle light from component holes RH of the light guide panel LGP (FIGS. 16 and 17) and so on.

Figure 16:
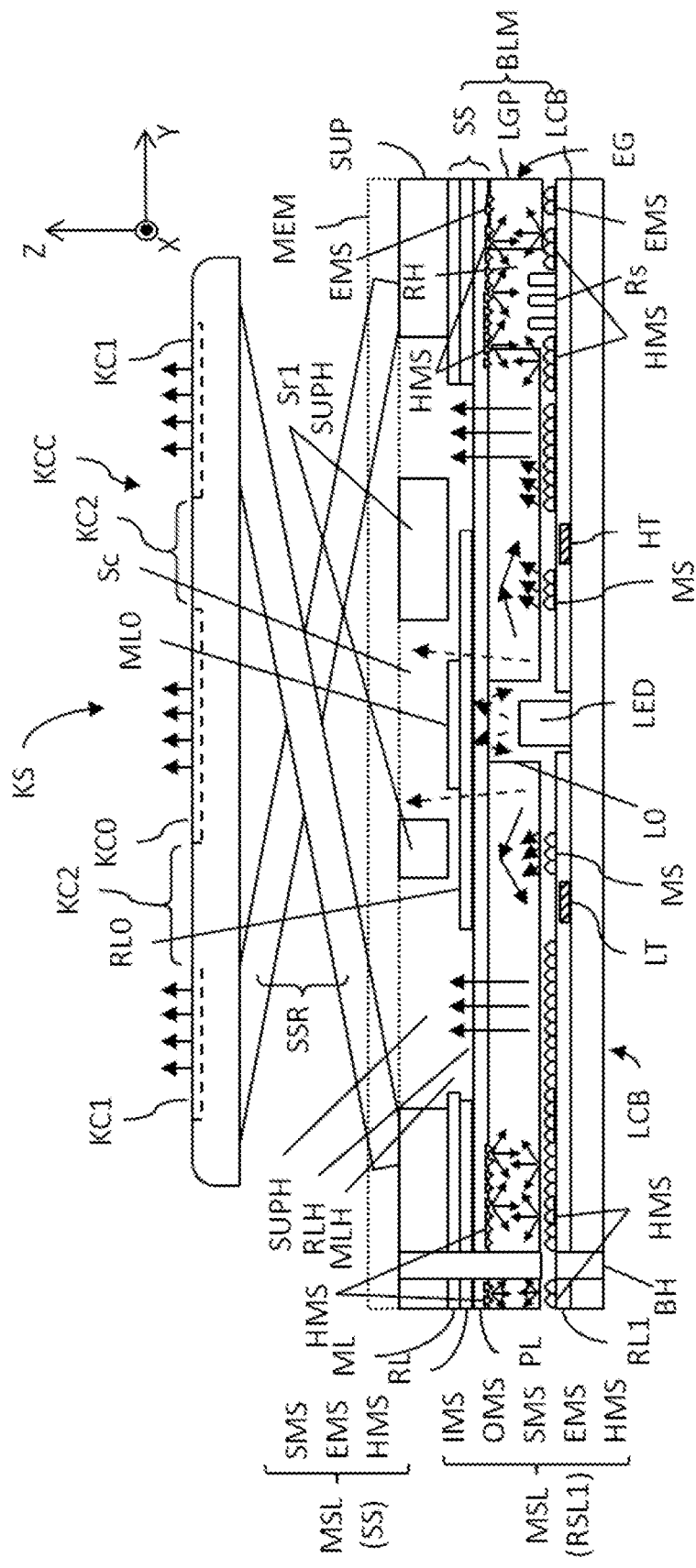
FIG. 16 is a partial sectional view of a lighting keyboard according to another embodiment of the present invention.
Figure 17:
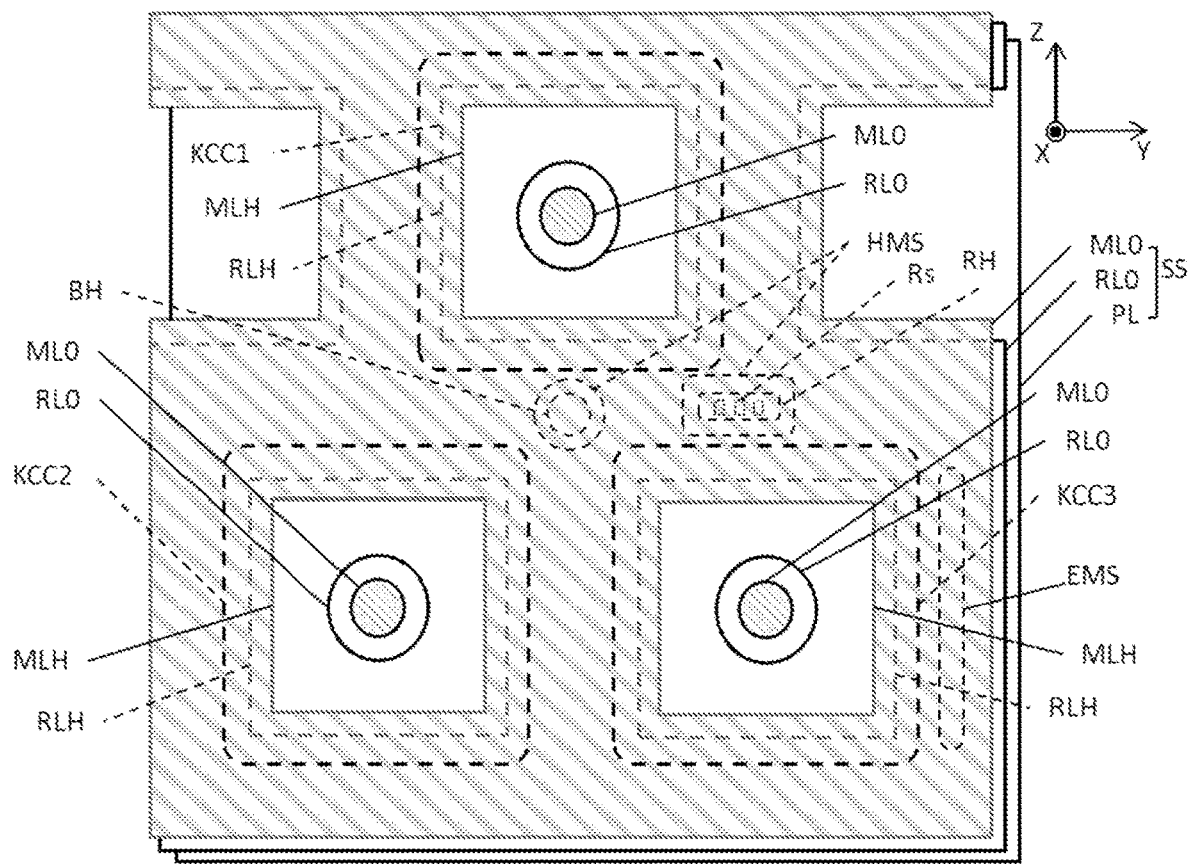
FIG. 17 is a partial top-view exploded diagram of a shielding sheet in FIG. 16 of the present invention.

Please refer to FIGS. 15-17 and FIGS. 12A, 12B, 13 and 14. FIG. 16 is a partial sectional view of a lighting keyboard according to another embodiment of the present invention. FIG. 17 is a partial top-view exploded diagram of a shielding sheet in FIG. 16 of the present invention.

In addition to the application for the adjacent keycaps KCC1/KCC2/KCC3, the edge micro-structure region EMS can also be applied to solve the light leakage problem at the edge EG of the light guide panel LGP (FIGS. 14-17). The edge micro-structure region EMS is formed between the edge EG of the light guide panel LGP and the adjacent (closest to the edge EG of the light guide panel LGP) reflective layer hole RLH and/or mask layer hole MLH. Since the slot SI3 or the slot pattern SP3 also provides the light blocking effect, the edge micro-structure region EMS can also be regarded as being formed between the edge EG of the light guide panel LGP and the slot SI3, or between the edge EG of the light guide panel LGP and the slot pattern SP3. In such a manner, the edge micro-structure region EMS, the slot SI3 and the slot pattern SP3 can partially reflect, partially recycle, partially turn and partially block the light before the light reaches the edge EG of the LGP, so as to achieve the effect of reducing light leakage.

The hole micro-structure region HMS can be formed on the lighting board LCB, the shielding sheet SS or the light guide panel LGP in the same manner as the slot micro-structure region SMS. The hole micro-structure region HMS is disposed around the board hole BH of the backlight module BLM. The hole micro-structure region HMS is located between the board hole BH and the edge micro-structure region EMS in FIG. 15. The edge micro-structure region EMS can be seamlessly connected to the hole micro-structure region HMS, and both the edge micro-structure region EMS and the hole micro-structure region HMS can be achieved by at least one outer micro-structure region OMS between two sets of non-intersecting (main) traces HT1/LT1 and HT2/LT2. On the whole, at least one micro-structure region MS/HMS/EMS is located between three adjacent keycaps KCC1/KCC2/KCC (or three lighting units LED1/LED2/LED3). The at least one micro-structure region MS/HMS/EMS is also located between the board hole BH of the backlight module BLM and at least three slots SI1/SI2/SI3. The at least three slots SI1/SI2/SI3 partially surround the adjacent three reflective layer holes or three mask layer holes MLH. The at least three slots SI1/SI2/SI3 can also be regarded as being located between two sets of non-intersecting (main) traces HT1/LT1 and HT2/LT2. To expand the scope, in FIG. 15, there is at least one slot SI1/SI2/SI3 formed between the three multicolor lighting units LED1/LED2/LED3 and the board hole BH. At least one micro-structure region MS/IMS/OMS is formed between each multicolor lighting unit LED1/LED2/LED3 and at least one corresponding slot SI1/SI2/SI3. At the same time, there is at least one micro-structure region MS/HMS/EMS/OMS formed between the three slots SI1/SI2/SI3 and the board hole BH. In such a manner, based on the multiplication of the diffusion effect of the micro-structure region and the blocking effect of the slot, the light can be partially reflected, partially recycled, partially turned, and partially blocked before reaching the board hole BH, thereby improving the light leakage problem of the board hole BH.

Furthermore, for recycling light from the component hole RH of the light guide panel LGP, the shielding sheet SS could cover the periphery and/or interior of the component hole RH of the light guide panel LGP, and the first reflective layer RL1 of the lighting board LCB could be partially overlapped with the periphery and/or interior of the component hole RH of the light guide panel LGP. The component hole RH is for accommodating at least one non-luminous component Rs (e.g., resistor, capacitor, driving chip or other non-luminous component required by light source circuit) protruding from the lighting board LCB. The aforesaid hole micro-structure region HMS could be disposed on the lighting board LCB, the shielding sheet SS and/or the light guide panel LGP and surround the component hole RH. The hole micro-structure region HMS could be also disposed on the lighting board LCB and/or the shielding sheet SS and overlapped with the interior of the component hole RH. Although there are limited concerns about light leakage in the component hole RH, the hole micro-structure region HMS can partially reflect, partially recycle and partially turn the light before and after the light reaches the component hole RH, so as to achieve full recycling and utilization of light.

The slot micro-structure region SMS, the edge micro-structure region EMS, the hole micro-structure region HMS and the inner/outer micro-structure regions IMS/OMS mentioned in the aforesaid embodiments are regions composed of plural micro-structures. In practice, the slot micro-structure region SMS, the edge micro-structure region EMS, the hole micro-structure region HMS and the inner/outer micro-structure regions IMS/OMS can be selectively integrated on one or more micro-structure layers MSL. For example, in FIGS. 14 and 15, a micro-structure layer MSL (first layer) could include the slot micro-structure region SMS, the edge micro-structure region EMS, the hole micro-structure region, and the inner/outer micro-structure regions IMS/OMS simultaneously disposed on the first reflective layer RL1 of the lighting board LCB. In FIGS. 14 and 15, a micro-structure layer MSL (second layer) could include the slot micro-structure region SMS, the edge micro-structure region EMS and the hole micro-structure region HMS (FIGS. 15 and 17) simultaneously disposed on the shielding sheet SS. If necessary, a micro-structure layer MSL (third layer, not shown in the figures) could be disposed on the light guide panel LGP. For example, the micro-structure layer MSL could include several micro-structure regions, which respectively correspond to the slot micro-structure region SMS, the edge micro-structure region EMS and the hole micro-structure region HMS of the shielding sheet SS.

Figure 18:
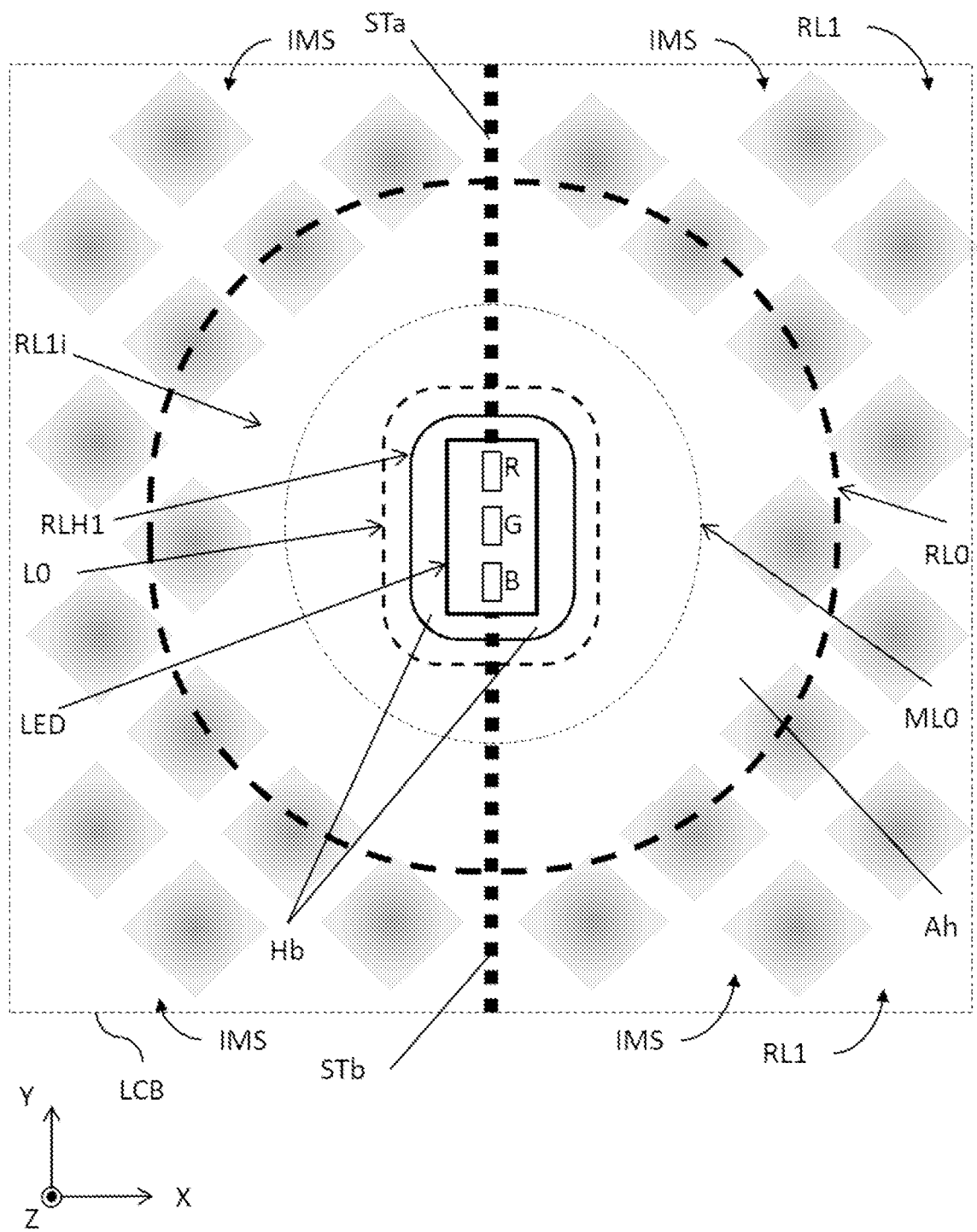
FIG. 18 is a partial top-view exploded diagram of a lighting board according to another embodiment of the present invention.

Moreover, if it is desired to improve the backlight saturation and chroma of one single keyswitch, sufficient light mixing is also very important. Please refer to FIG. 18, which is a partial top-view exploded diagram of a lighting board according to another embodiment of the present invention. When the lighting unit LED is packaged with three chips to provide three color lights (e.g., red, green, and blue lights), the present invention adopts a specific design for achieving a preferable light mixing effect. First of all, the three chips could be arranged continuously from long side to long side. Its advantage is that the overall size of the lighting unit LED is relatively short and the lighting unit LED is less likely to interfere with the small-sized panel hole L0 when the chip offset occurs. However, its disadvantage is that the light mixing effect is poor since the long side of the chip with a large amount of light emission is blocked by the long side of the adjacent chip such that it is not easy to mix different color light. Another design is to arrange each long side of the three chips to be parallel to the long side of the lighting unit LED. That is, each long side of the three chips is arranged along the Y direction, or the three chips are arranged continuously from short side to short side. In such a manner, the long sides of the chips with a large amount of light emission and a large range of light output are all facing the X direction in the figure and overlapped with each other, and a better light mixing effect can be obtained within the two larger fan-shaped ranges in the X direction. At the same time, since the short sides of the chips with a small amount of light emission and a small range of light output are adjacent to each other in the Y direction, there is less light blocked by the short sides of the chips, so as to avoid the color shift problem.

In summary, in the embodiments provided in FIGS. 12A, 12B, 13, 14, 15, 16, 17 and 18 of the present invention, the optimal configuration of the micro-structure regions and the slots can improve the problem of color light being incident to the adjacent keycaps, and make full use of the limited light to achieve the best chroma and color saturation of one single keyswitch. The light mixing effect of the lighting unit LED can be further improved by the aforesaid arrangement of the three chips.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backlight module for emitting at least one keycap, the backlight module comprising:
   two lighting units;
   a light guide panel having two panel holes for accommodating the two lighting units, the light guide panel further comprising at least one slot located between the two lighting units;
   a lighting board disposed in parallel to the light guide panel, the lighting board having at least one pair of non-intersecting main traces electrically connected to the two lighting units; and
   a micro-structure layer disposed in parallel to the light guide panel, the micro-structure layer comprising at least one micro-structure region;
   wherein the at least one micro-structure region is located between the two lighting units, and the at least one slot of the light guide panel is at least partially located in the micro-structure region.

2. The backlight module of claim 1, wherein the light guide panel has two slots corresponding to the two lighting units, and the micro-structure region is at least partially located between the two slots.

3. The backlight module of claim 1, wherein the pair of non-intersecting main traces passes through the at least one slot.

4. The backlight module of claim 1, wherein the at least one micro-structure region is not overlapped with the pair of non-intersecting main traces.

5. The backlight module of claim 1, wherein the micro-structure region at least partially surrounds the at least one slot.

6. The backlight module of claim 1, wherein the at least one micro-structure region is at least partially overlapped with the at least one slot.

7. The backlight module of claim 1, wherein the backlight module further comprises a shielding sheet, and the shielding sheet comprises an inner reflecting portion covering the lighting unit.

8. The backlight module of claim 1, wherein the backlight module further comprises a shielding sheet, the shielding sheet comprises a reflective layer hole allowing light to exit, and the micro-structure region is at least partially located between the reflective layer hole and the at least one slot.

9. The backlight module of claim 1, wherein the backlight module further comprises a shielding sheet, the shielding sheet comprises two adjacent reflective layer holes allowing light to exit, and the at least one slot is located between the two adjacent reflective layer holes.

10. The backlight module of claim 1, wherein the backlight module further comprises a shielding sheet, and the micro-structure region is located on a surface of at least one of the shielding sheet, the light guide panel and the lighting board.

11. The backlight module of claim 1, wherein the backlight module further comprises a shielding sheet, the shielding sheet comprises two adjacent reflective layer holes allowing light to exit, and the pair of non-intersecting main traces passes through the two reflective layer holes.

12. The backlight module of claim 1, wherein the lighting board further has a first reflective layer, and the micro-structure region is located on a surface of the first reflective layer.

13. The backlight module of claim 1, wherein the lighting board further has a first reflective layer covering the pair of non-intersecting main traces.

14. The backlight module of claim 1, wherein the lighting unit provides three color lights.

15. The backlight module of claim 1, wherein the backlight module has a board hole, and the at least one slot is connected to the board hole.

16. The backlight module of claim 1, wherein the micro-structure region is located between the pair of non-intersecting main traces.

17. The backlight module of claim 1, wherein the at least one slot is located between the pair of non-intersecting main traces.

18. A lighting keyboard comprising:
   a plurality of keyswitches having a keycap respectively; and
   a backlight module of claim 1 located under the plurality of keyswitches.

19. A backlight module for emitting at least one keycap, the backlight module comprising:
   a lighting unit;
   a light guide panel having a panel hole for accommodating the lighting unit, the light guide panel further comprising a slot pattern surrounding the lighting unit, and the slot pattern comprising a plurality of slots;
   a lighting board having at least one pair of non-intersecting traces electrically connected to the lighting unit; and
   a micro-structure layer disposed in parallel to the light guide panel, the micro-structure layer comprising at least one micro-structure region;
   wherein the slot pattern is overlapped with the at least one micro-structure region.

20. A backlight module for emitting at least one keycap, the backlight module comprising:
   a lighting unit;

a light guide panel having a panel hole for accommodating the lighting unit, the light guide panel further having an edge away from the lighting unit;

a lighting board having at least one pair of non-intersecting traces electrically connected to the lighting unit;

a shielding sheet comprising a reflective layer hole allowing light to exit;

wherein a micro-structure region is at least partially located between the reflective layer hole and the edge of the light guide panel; and wherein the light guide panel has a slot, the slot is located outside the reflective layer hole, and the micro-structure region is formed between the edge and the slot of the light guide panel.

21. A lighting board comprising:

a light guide panel comprising a panel hole and at least two slots;

at least one pair of non-intersecting traces disposed in parallel to the light guide panel;

a micro-structure layer disposed in parallel to the light guide panel, the micro-structure layer comprising at least two micro-structure regions spaced apart from each other; and a lighting unit located in the panel hole and located between the at least two micro-structure regions;

wherein the at least two slots surround the lighting unit, and the at least two micro-structure regions are located between the at least two slots.

22. A lighting board comprising:

three lighting units;

a light guide panel comprising three panel holes for accommodating the three lighting units, the light guide panel further comprising at least three slots located between the three lighting units; and at least one micro-structure layer disposed in parallel to the light guide panel, the at least one micro-structure layer comprising at least one micro-structure region located between the three lighting units;

wherein the at least one micro-structure region surrounds the three panel holes and the at least three slots.

\* \* \* \* \*